(12) United States Patent
Milner et al.

(10) Patent No.: US 8,831,524 B2
(45) Date of Patent: Sep. 9, 2014

(54) SYSTEMS, METHODS, DEVICES, AND COMPUTER PROGRAM PRODUCTS FOR CONTROL AND PERFORMANCE PREDICTION IN WIRELESS NETWORKS

(75) Inventors: Stuart D. Milner, Potomac, MD (US); Christopher C. Davis, Bowie, MD (US); Jaime Llorca, Washington, DC (US)

(73) Assignee: University of Maryland, College Park, College Park, MD (US)

( * ) Notice: Subject to any disclaimer, the term of this patent is extended or adjusted under 35 U.S.C. 154(b) by 159 days.

(21) Appl. No.: 13/443,725

(22) Filed: Apr. 10, 2012

(65) Prior Publication Data

US 2013/0017796 A1    Jan. 17, 2013

Related U.S. Application Data

(60) Provisional application No. 61/474,180, filed on Apr. 11, 2011.

(51) Int. Cl.

| | |
|---|---|
| *H04B 1/00* | (2006.01) |
| *H04B 15/00* | (2006.01) |
| *H04B 17/00* | (2006.01) |
| *H04L 12/28* | (2006.01) |
| *H04W 24/02* | (2009.01) |
| *H04W 16/22* | (2009.01) |
| *H04W 24/04* | (2009.01) |

(52) U.S. Cl.
CPC .............. *H04W 24/02* (2013.01); *H04W 16/22* (2013.01); *H04W 24/04* (2013.01)
USPC ................. 455/63.2; 455/67.11; 370/256

(58) Field of Classification Search
USPC .............. 455/449, 427, 431, 11.1, 12.1, 63.1, 455/63.2, 67.11; 370/254, 256, 310
See application file for complete search history.

(56) References Cited

U.S. PATENT DOCUMENTS

| | | | |
|---|---|---|---|
| 6,990,350 B2 | 1/2006 | Davis et al. | |
| 2004/0017783 A1* | 1/2004 | Szentesi et al. | 370/256 |
| 2012/0033577 A1* | 2/2012 | Chiang | 370/252 |
| 2013/0182561 A1* | 7/2013 | Xu et al. | 370/225 |

OTHER PUBLICATIONS

Zhang et al., "A novel flocking inspired algorithm for self-organization and control in heterogeneous wireless networks," *2010 Sixth International Conference on Intelligent Sensors, Sensor Networks and Information Processing (ISSNIP)*, Dec. 2010, pp. 239-244.
Llorca et al., "A Convex Optimization Method for Autonomous Self-Organization in Dynamic Wireless Networks," IEEE 2008.

(Continued)

*Primary Examiner* — Nguyen Vo
(74) *Attorney, Agent, or Firm* — Miles & Stockbridge P.C.; Frederick F. Rosenberger

(57) ABSTRACT

Systems, methods, devices, and computer program products are directed to mobility control and performance prediction in directional wireless networks. Network coverage and connectivity are optimized. Convex and non-convex network modeling is implemented to provide adaptive topology control and mobility control within the network, whereby communication links are retained, released, or reconfigured based on their communication role within the network architecture. Optionally or alternatively, network health is monitored, future network failure or degradation conditions are predicted, and the network reconfigures responsive to the predictions to avoid the failure or degradation conditions.

18 Claims, 15 Drawing Sheets

(56) References Cited

OTHER PUBLICATIONS

Milner et al., "Autonomous Reconfiguration and Control in Directional Mobile Ad Hoc Networks," IEEE Circuits and Systems Magazine (2009), pp. 10-26.

Llorca et al., "Molecular System Dynamics for Self-Organization in Heterogeneous Wireless Networks," EURASIP Journal on Wireless Communications and Networking, vol. 2010, pp. 1-13.

Milner et al., "Control and Prediction in Hierarchical Wireless Networks," IEEE (2011), pp. 397-402.

* cited by examiner

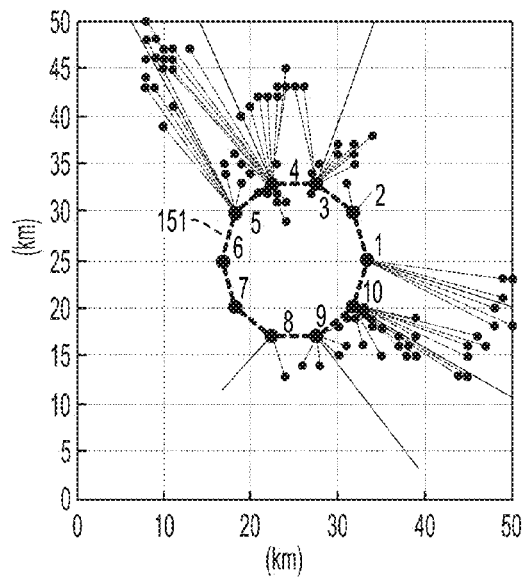
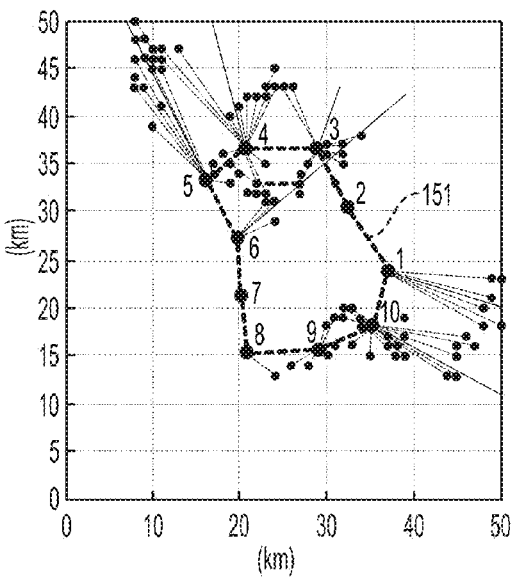
FIG. 7A                    FIG. 7B
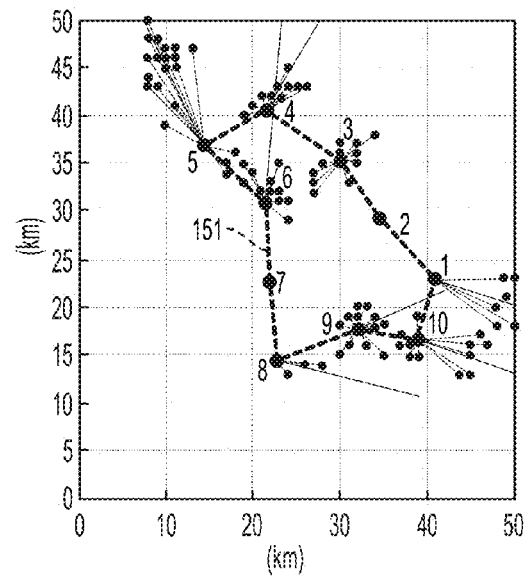
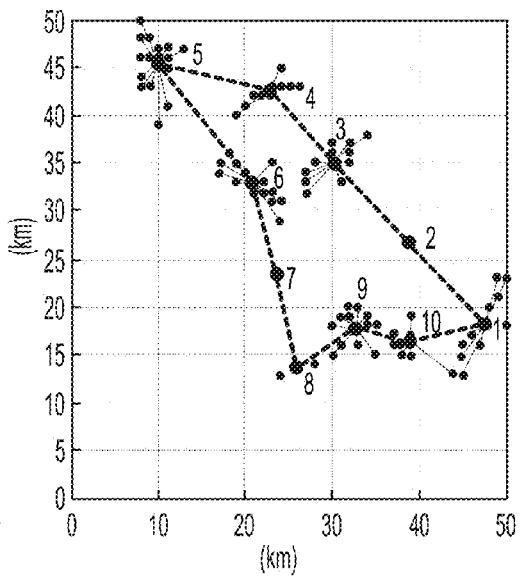
FIG. 7C                    FIG. 7D

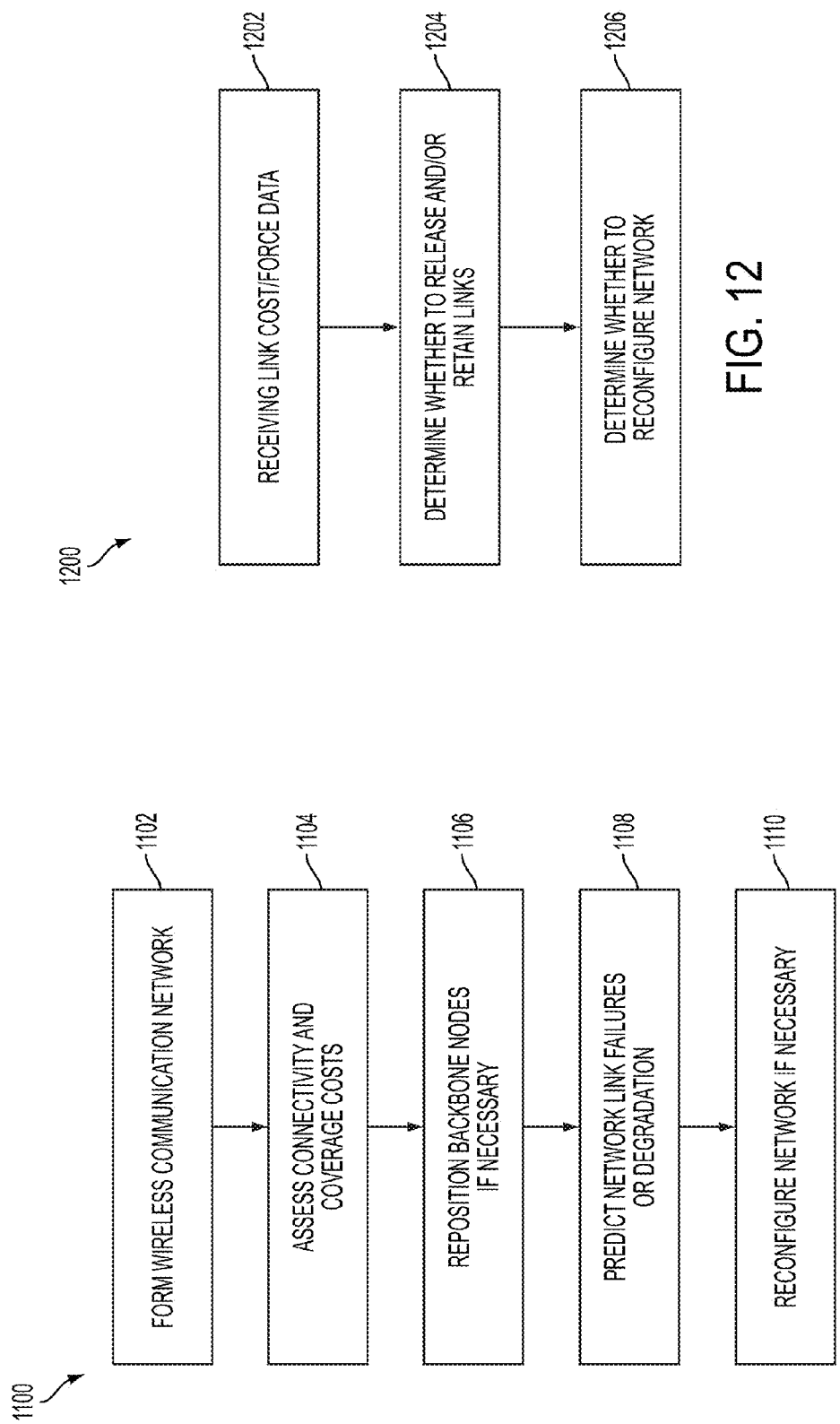

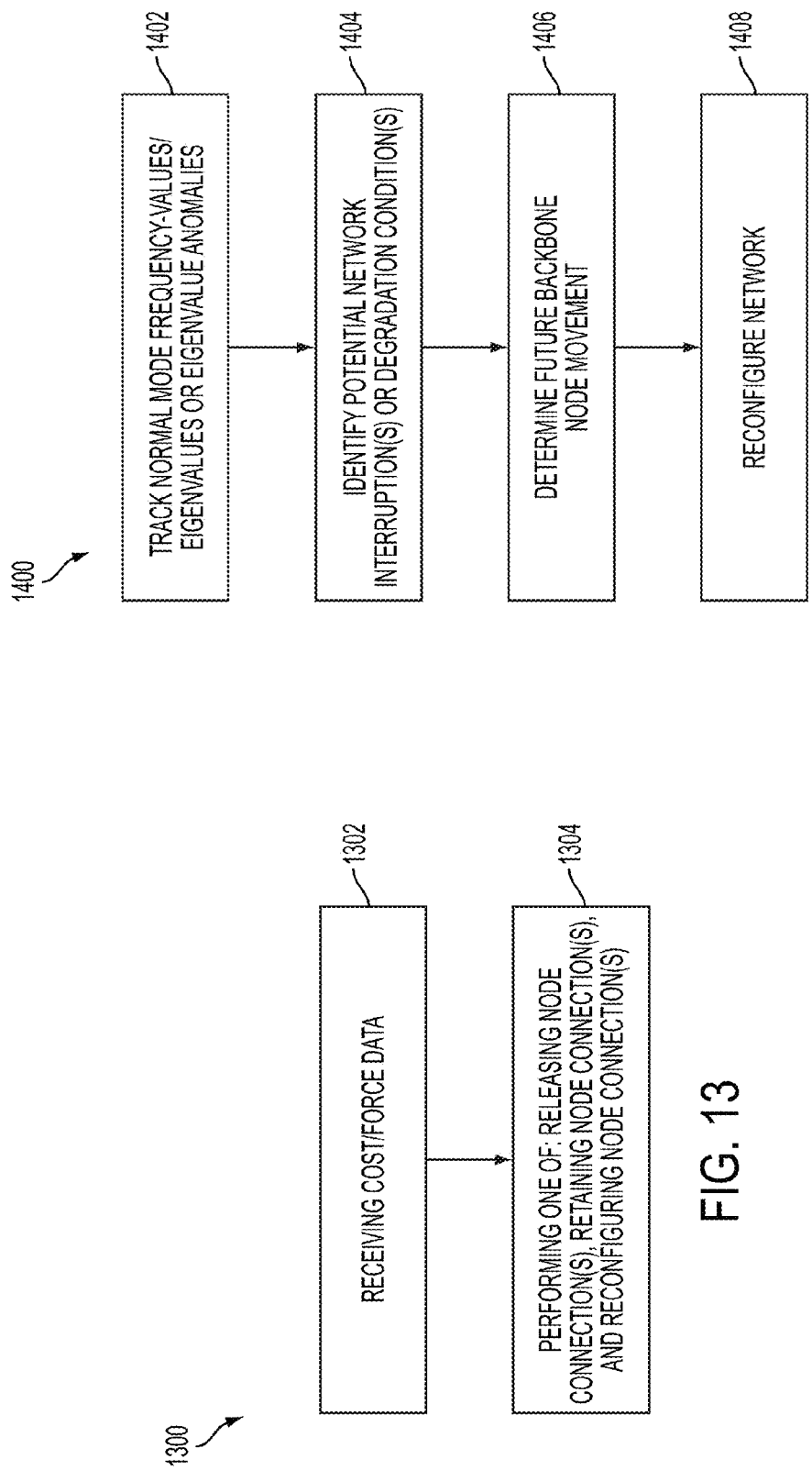

SYSTEMS, METHODS, DEVICES, AND COMPUTER PROGRAM PRODUCTS FOR CONTROL AND PERFORMANCE PREDICTION IN WIRELESS NETWORKS

CROSS-REFERENCE TO RELATED APPLICATIONS

This application claims priority to and the benefit of U.S. Provisional Application No. 61/474,180 filed Apr. 11, 2011, the content of which is incorporated herein by reference in its entirety.

FEDERALLY SPONSORED RESEARCH AND DEVELOPMENT STATEMENT

This invention was made with government support under Grant/Contract No. ECCS0946955 awarded by the National Science Foundation ("NSF") and Grant/Contract No. FA95500910121 awarded by the Air Force Office of Scientific Research ("AFOSR"). The government has certain rights in the invention.

FIELD

The present invention relates to mobility control and topology control for heterogeneous wireless networks. The present invention also relates to network health monitoring and performance prediction in heterogeneous wireless networks.

SUMMARY

The Summary describes and identifies features of embodiments, but not all features and not all embodiments. Rather, it is presented as a convenient summary of some embodiments, but not necessarily all. Further, the Summary does not necessarily identify critical or essential features of the embodiments, disclosed subject matter, or claims.

Generally speaking, the present invention is directed to dynamic positioning, mobility management, and/or topology control for network self-optimization, and/or health monitoring for performance prediction in heterogeneous wireless networks. Network coverage and connectivity can be optimized and/or maintained at a certain, predetermined level. One or more embodiments of the invention involve adaptive topology control or management within directional wireless networks based on network models, whereby communication links can be retained, released, and/or reconfigured based on their communication role or assigned priority within the network architecture. Optionally or alternatively, one or more embodiments of the invention monitor network health and predict future likely network failure or degradation conditions, with the network reconfiguring in response to the predictions to avoid the failure or degradation conditions.

One or more embodiments can include an adaptive control method for a wireless backbone network, comprising: continuously determining respective costs associated with a plurality of wireless broadband communication links between backbone nodes of the wireless backbone network and corresponding terminal nodes, the link cost being modeled using a non-convex model of link potential energy; and determining whether to release or relax any of the links based on the continuously determining, wherein any of the links are relaxed if the determined respective cost exceeds a predetermined value associated with a physical constraint characteristic of the corresponding backbone and terminal nodes.

The method can further comprise continuously determining respective costs associated with a plurality of wireless broadband backbone-backbone communication links, the link cost being modeled using a convex model of link potential energy; and repositioning one or more of the backbone nodes to retain connection of all backbone nodes to the network. Optionally, the method can include predicting network health, wherein the predicting includes prediction of link degradation, network partition, and/or node failures. Optionally, in the method, the backbone-backbone links can be higher in priority than the backbone-terminal node links.

One or more embodiments of the invention can also include a method for predicting network health of a heterogeneous, Internet Protocol (IP)-based network having terminal platforms and backbone platforms, the backbone platforms being implemented in a directional wireless backbone network, the method comprising: determining possible future occurrences of unwanted or undesirable network conditions, the determining including tracking normal mode frequencies associated with terminal platform and backbone platform movement; and responsive to said determining, automatically reconfiguring the network to avoid any determined possible future unwanted or undesirable network conditions. Optionally, the method can further comprise determining future movement of backbone platforms based on any determined possible future unwanted or undesirable network conditions. Optionally, the automatically reconfiguring the network can include one or more of movement of one or more of the backbone platforms, release of one or more backbone-terminal platform connections, and network topology reconfiguration.

A normal mode tending toward zero can indicate a possible future occurrence of unwanted or undesirable network condition. Further, the unwanted or undesirable network conditions can include link degradation or failure, network partition, and/or platform degradation or failure.

Additionally, one or more embodiments can include a dynamic, heterogeneous, directional wireless backbone (DWB)- and Internet Protocol (IP)-based network having a multi-tiered architecture operative to provide end-to-end broadband connectivity in a dynamic wireless environment, the network comprising: in a first tier thereof, plural sets of terminal nodes, each set of terminal nodes including one or more terminal nodes; and in a second tier thereof, a directional wireless backbone network that is operative to provide directional wireless communication at bandwidths of gigabits per second (Gb/s) and below, the directional wireless backbone network including a plurality of movable backbone nodes, each of the movable backbone nodes being of higher capability than each of the one or more terminal nodes. The network is operative to employ adaptive and self-organizing control methodologies, such that: movement and positioning of the backbone nodes with respect to the terminal nodes are controlled so as to automatically and continuously attempt to maintain network performance; upon detection of a link degradation event, dynamic determination is performed regarding whether to release or retain the link associated with the degradation event, or to reconfigure the topology of the directional wireless backbone network, based on a role of the link in the network; and movement and positioning of the backbone nodes are controlled based on predicted future network degradation to prevent the future degradation or to mitigate effects of the future degradation. The dynamic determination regarding whether to release the link is applicable only for non-essential links and is based on non-convex characterizations of potential energy of the non-essential links in the presence of physical constraints, and the dynamic determination regarding whether to retain the link is applicable for essential links and is based on convex characterizations of potential energy of the essential links.

Optionally, the non-convex characterizations of potential energy of the non-essential links in the presence of physical constraints can be represented by the Morse potential. In one or more embodiments, the non-essential links can be between backbone nodes and terminal nodes, and the essential links can be between backbone nodes. Optionally, the two-tiered architecture may include only the first and second tiers. Further, a platform of the directional wireless backbone network can be airborne, terrestrial, extraterrestrial, sea-based, or a combination of one or more thereof.

The directional wireless communication can be via one or more of free space optical (FSO) transmission and reception and directional radio frequency (RF) transmission and reception. Optionally, the directional wireless communication includes free space optical (FSO) transmission and reception, the FSO transmission being implemented by beam steering. Alternatively or optionally, the directional wireless communication includes directional radio frequency (RF) transmission and reception, the directional RF transmission being implemented by beam steering. Optionally, the beam steering is performed by mechanical movement of corresponding transmitting antennae. Alternatively or optionally, the beam steering is performed by phased array methodology in corresponding transmitting antennae.

The dynamic wireless environment can be subject to uncontrolled network dynamics including terminal node mobility, atmospheric attenuation or obscuration, and/or geographic or man-made obstacles. Further, uncontrolled network dynamics can include terminal node mobility and/or atmospheric attenuation, which may cause link degradation through received power reduction manifested by an increase in link bit-error-rate (BER) and/or an increase in transmitted power requirements.

A link degradation event may be a physical limitation associated with a pair of network nodes, the physical limitation being one of a distance between the pair of nodes, an obscuration between the pair of nodes, and a transmission power associated with the pair of nodes. Further, optionally, a link degradation event may be a change in the link state caused by one or more of atmospheric turbulence, atmospheric attenuation, and path loss.

The network can include distributed algorithms that show constant time complexity and produce optimal solutions based on local interactions, for instance. Maintaining network performance can include one or more of network communication optimization, maintaining a predetermined quality of service level, and minimization of communication energy and optimization of network connectivity.

In one or more embodiments, the movement and positioning of the backbone nodes with respect to the terminal nodes may be controlled so as to automatically and continuously maintain network performance. Optionally, the backbone nodes are controlled to move so as to follow corresponding terminal nodes.

For one or more embodiments, the network may be a cellular network or have a cellular network as a component thereof. The broadband connectivity of the network can include communications at one or more of at or about 900 MHz, at or about 1.8 GHz, at or about 2.1 GHz, at or about 2.4 GHz, and at or about 5 GHz, and at or about E-band frequencies. Further, the bandwidth can be from at or about 2.4 Gb/s to at or about 10 Gb/s.

Optionally, the predicted network degradation can include network topology anomalies, and predicted future network degradation may be based on correlations between peaks in eigenvalues of the Hessian matrix of the network potential and network topology anomalies. Optionally, the movement and positioning of the backbone nodes based on predicted network degradation can include control of present backbone node movement and positioning and determination of future backbone node movement and positioning. Further, optionally, when future network degradation is predicted, the network is operative to reconfigure by moving and repositioning nodes and/or their topology.

One or more embodiments also include a mobility control and link-failure prediction method implemented in a directional wireless backbone (DWB)-based communication network having multiple tiers of nodes for providing access to the communication network including end-user nodes and movable backbone nodes, the method comprising: forming a plurality of wireless communication links between the end-user nodes and the backbone nodes and between the backbone nodes, respective backbone-backbone wireless communication links being characterized as essential network communication links, and respective backbone-end-user wireless communication links being characterized as non-essential network communication links; automatically moving the backbone nodes in relation to corresponding end-user nodes, the moving being based on a convex model for the essential network communication links and a non-convex model for the non-essential network communication links; predicting network link failures by tracking normal mode frequencies as the backbone and end-user nodes move; and responsive to said predicting network link failures, reconfiguring the network before occurrence of any predicted network link failures and so as to avoid or mitigate the effects of any predicted network link failures. The automatically moving the backbone nodes and said predicting network link failures are performed in parallel.

Optionally, the method can further comprise determining future movement of the backbone nodes based on any predicted network link failures. The communication network may be operative to relay datagrams. Optionally, a normal mode tending toward zero can indicate a potential link failure. In one or more embodiments, the backbone-backbone wireless communication links can include directional wireless transmissions, the directional wireless transmissions being in the form of one or more of free space optical (FSO) transmissions and directional radio frequency (RF) transmissions. Additionally, optionally, the method is implemented by distributed algorithms. The distributed algorithms can show constant time complexity. Further, the distributed algorithms can produce global optimal solutions based on local interactions.

In one or more embodiments, automatically moving the backbone nodes can be continuously attempt to maintain and/or optimize network performance. Optionally, the automatically moving the backbone nodes may be such that the backbone nodes follow corresponding end-user nodes to provide an aggregate network quality of service level. In addition, optionally, the automatically moving the backbone nodes may be responsive to determinations regarding whether to release non-essential network communication links and whether to retain essential network communication links. Alternatively or optionally, the automatically moving the backbone nodes can be responsive to determinations regarding whether to reconfigure the topology of the network.

Embodiments of the invention also include methods, systems, devices, apparatuses, and computer program products, as shown and described herein.

BRIEF DESCRIPTION OF THE DRAWINGS

The accompanying drawings illustrate embodiments of the invention. The disclosed subject matter will be best understood by reading the ensuing specification in conjunction with the drawing figures, in which like elements are designated by like reference numerals.

FIGS. 7A-7D are graphs representative of an evolution of backbone network configuration over time.

FIG. 11 is a flow chart of a method according to one or more embodiments of the invention.

FIG. 12 is a flow chart for another method according to one or more embodiments of the invention.

FIG. 13 is a flow chart for yet another method according to one or more embodiments of the invention.

FIG. 14 is a flow chart for a method according to one or more embodiments of the invention.

DETAILED DESCRIPTION

Figure 1:
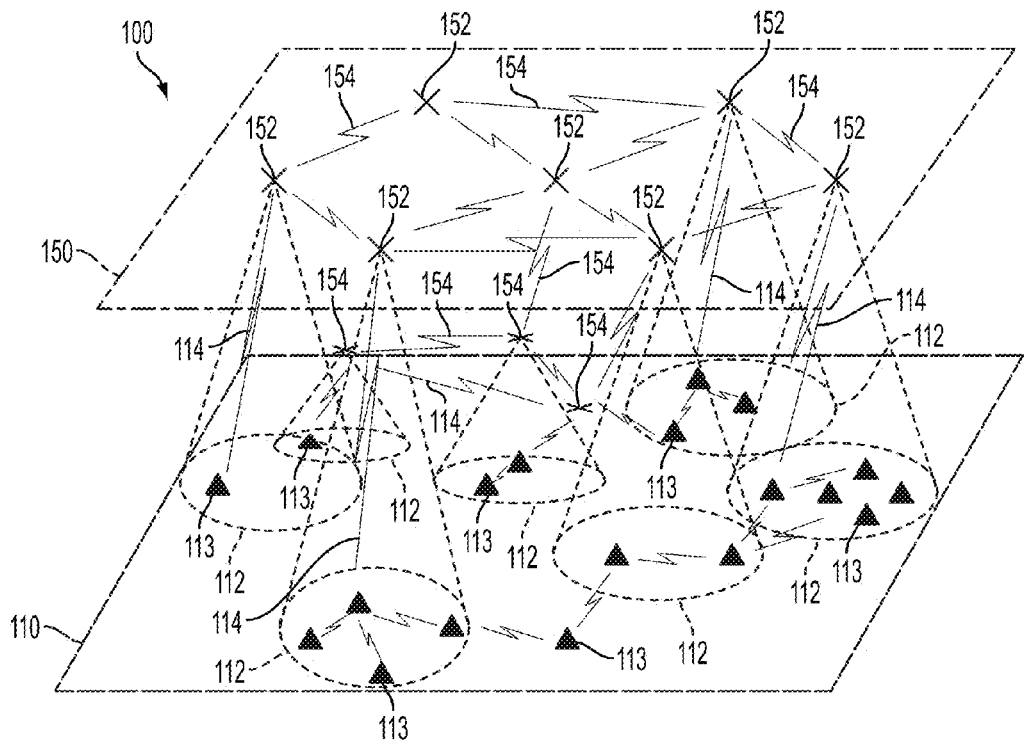
FIG. 1 is diagram of a multi-tiered hierarchal wireless network and system according to one or more embodiments of the invention.

The present invention, generally speaking, involves self-optimization, dynamic positioning, mobility management, and/or health monitoring and performance prediction in wireless networks.

The wireless network environment can be heterogeneous and dynamic. The network environment can be heterogeneous in the sense that multiple communication devices using multiple different wireless communication methodologies may make up the network. Further, the wireless network can be dynamic due to node mobility, node addition/deletion, channel attenuation, blockage due to changing terrain or weather/environmental characteristics (e.g., atmospheric attenuation or turbulence), network congestion, and communication jammers, for instance. Such dynamics can be understood as being uncontrolled from the perspective of the wireless network.

The present invention involves models and methods for the control and positioning (i.e., repositioning) of dynamic wireless backbone platforms in order to guarantee their coverage of mobile end user devices while simultaneously ensuring that the backbone or backhaul bandwidth is maximized. More specifically, one or more embodiments of the present invention can provide topology control and mobility control. That is, a self-organizing backbone (i.e., base stations) can be implemented along with topology control, which can provide dynamic redirection of wireless links, pointing, acquisition and tracking, as well as mobility management, which can include dynamic repositioning of backbone nodes. Accordingly, one or more embodiments of the present invention can provide an autonomous, self-organizing, and self-optimizing positioning system or method that enables base stations or backbone nodes to "follow" end users to optimize connectivity and coverage of terminal nodes associated with the end users in order to assure and optimize network performance, such as network quality of service.

As a more specific example, in a dynamic wireless network using a packet switched protocol (e.g., IP) according to one or more embodiments of the invention, the backbone platform or platforms (e.g., base stations and backhaul nodes) can be managed to move autonomously in order to optimize and assure coverage and connectivity between end user devices, such as stationary and mobile end user devices. Such networks can provide relatively high bandwidth, for instance, up to 100 Gigabits/second (Gb/s), combined with mobile wireless IP backbone infrastructures to thereby provide "instant" communication infrastructure, in some cases critical infrastructure, capable of multimedia transmission in response to tactical military, emergency response, surveillance, transportation monitoring, and homeland security operations to name a few.

Additionally, one or more embodiments of the invention implement adaptive control within dynamic and heterogeneous wireless networks based on network models, whereby communication links can be retained, released, and/or reconfigured based on their communication role within the network architecture. Such control can optimize network performance in terms of network coverage and backbone connectivity. For instance, uncontrolled network dynamics, such as terminal node mobility and atmospheric attenuation, may cause link degradation manifested by an increase in link bit-error-rate (BER), transmitted power requirements, or received power requirements, for instance. Uncontrolled network dynamics can also cause link breakage or failure. Upon the detection of a link degradation or failure event, the present invention can use an adaptive control methodology to consider the release, retention, or reconfiguration of one or more associated communication links based on their role in the network architecture. As will be discussed later, a node's role in the network can be its priority level within the network or its essentiality to the network.

Optionally or alternatively, one or more embodiments of the invention monitor network performance health and predict future likely network failure or degradation conditions, with the network reconfiguring in response to the predictions to avoid the failure or degradation conditions. Further, methods and models can be used for the prediction of anomalies that will require future backbone node movement. Accordingly, mobile backbone nodes can be controlled in response to determined or identified likely future anomalies, and link degradation or failure can be predicted and therefore prevented or mitigated.

Networks according to embodiments of the invention can include a multi-tiered architecture, for instance, a two-tiered architecture, where a first tier can include one or more sets of end user devices interconnected through a second tier comprised of a wireless backbone network having a plurality of backbone nodes and optionally backhaul nodes. Some or all of the backbone nodes can be higher in capability or capacity than some or all of the end user nodes. The higher capability or capacity backbone nodes can be defined or designed as being of higher priority than some or all of the end user nodes. Thus, some or all of the end user nodes can be defined or designated as lower priority nodes. In one or more embodiments, a high priority node can mean that the node is essential, and a low priority node can mean that the node is nonessential. Accordingly, the backbone network may be considered a higher capacity tier with higher priority than the tier having the end-user or terminal nodes associated with the end user devices. Additionally, optionally, some backbone nodes can have a higher priority than other backbone nodes.

Generally speaking, the first and second network tiers can have complementary capabilities. The first tier, the lower tier, can be ad-hoc in nature, for instance, ad-hoc topology comprised of a large number of nodes organized in clusters, relatively lower connectivity, high reconfiguration rate, etc. Further, the lower tier can implement wireless transmissions via low-capacity RF, may use omni-directional transmission, and may implement radio cognition and control via associated communications components and circuitry (e.g., transceivers, processors, antennas, etc.). On the other hand, the second tier, the higher tier, can form a wireless backbone network and can use directional wireless communications, such as such as free space optical (FSO) and/or directional RF to aggregate and transport traffic. Accordingly, the wireless backbone network may be termed a directional wireless backbone (DWB) network.

The directional wireless backbone network can have as platforms airborne, terrestrial, extraterrestrial, sea-based platforms, or any combination thereof. Terrestrial platforms can include near-surface, surface, and sub-surface platforms. As an example, a plurality of airborne vehicles, such as airplanes, helicopters, unmanned aerial vehicles, (UAVs), or a combination thereof may form an airborne platform, with each including telecommunication and processing components and circuitry to operate as a backbone node of the directional wireless backbone network. As another example, for an extraterrestrial platform, one or more satellites may form backbone nodes for some or all of the directional wireless backbone network. Other vehicles or articles can be used to form backbone networks or portions thereof, such as a tank, a Humvee, a ship, a submarine, etc. The vehicles forming the backbone nodes can have communication components, such as one or more transceivers (or separate transmitters and receivers), processors, antennas, etc., to send and receive communication signals. As but one example, some or all of the vehicles forming backbone nodes can include communication components and circuitry as set forth in U.S. Pat. No. 6,990,350, which is herein incorporated by reference in its entirety.

Turning to the figures, FIG. 1 is a diagram of a multi-tiered hierarchal wireless network and system 100 according to one or more embodiments of the invention.

System 100 can include a plurality of terminal nodes 113 is a first tier 110 and a plurality of backbone nodes 152 in a second tier 150. Optionally, system 100 can include a plurality of backhaul nodes in the second tier. Backbone nodes 153 can be at different heights or altitudes and are not necessarily constrained by the plane representing the second tier 150 in FIG. 1. Similarly, the terminal nodes 113 also can be at different heights or altitudes. The terminal nodes 113 can be arranged in groups or sets 112. Further, each terminal node set 112 may be a flat ad-hoc wireless network. Thus, system 100 can include a multi-tiered architecture where sets 112 of terminal nodes 113 are interconnected through a backbone network represented by the backbone nodes 152 of the second tier 150 (and optionally the backhaul nodes 153). The backbone-backbone wireless communication links 154 can be formed using directed communication techniques, for instance, free space optical (FSO) and/or directional radio frequency (RF) communication, such as set forth in U.S. Pat. No. 6,990,350 (previously incorporated by reference), to aggregate and transport traffic to and from the first tier 110. In FIG. 1, backbone node-terminal node wireless communication links are indicated as items 114.

Figure 2:
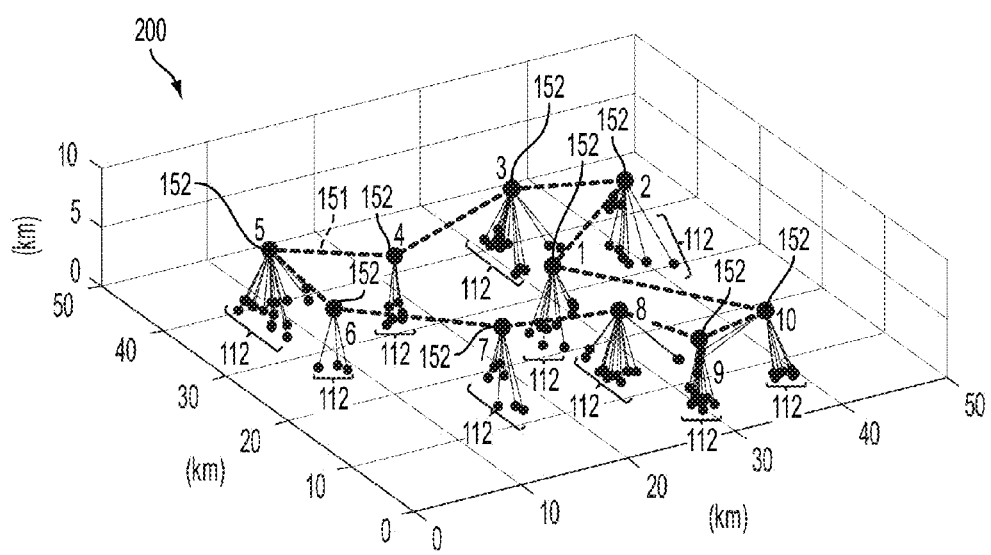
FIG. 2 is diagram of a two-tiered hierarchal wireless network and system according to one or more embodiments of the invention.

FIG. 2 is diagram of another example of a hierarchal wireless network and system 200 according to one or more embodiments of the invention. System 200 is a two-tiered hierarchal wireless network and system. Like system 100, system 200 includes a plurality of backbone nodes 152 and a plurality of sets 112 of terminal nodes. The backbone nodes 152 form a directional wireless backbone network. FIG. 2 shows the backbone nodes 152 being "connected," i.e., having communication links 151 formed between only certain backbone nodes. The backbone-backbone node connections shown in FIG. 2 can indicate a particular current directional wireless backbone network topology.

As indicated earlier, directional wireless backbone-based networks can be subject to changing platform (e.g., node mobility, node additional and deletion) and link state (e.g., atmospheric turbulence, atmospheric attenuation, path loss) conditions. Thus, systems 100, 200 can be subject to topology and mobility control mechanisms to provide self-organizing capabilities that enable the network to adapt to the changing network environment in order to optimize and/or maintain network performance, as set forth above.

Robustness in physical systems is related to the system's potential energy, which is defined as the energy a system has due to its physical configuration in space. A wireless network is, in essence, electromagnetic energy being propagated among a set of nodes in space. The location of the network nodes and the choice of communication links between them define the network topology, which determines the total energy usage for the network system. Thus, the potential energy of a communications network can be defined as the total communications energy needed to maintain network performance given its physical configuration.

Uncontrolled parameters such as the mobility of terminal nodes (whose motion may be determined by their respective missions, tasks, or applications) and the presence of atmospheric obscuration can change the energy of the network system. Physical systems can naturally react to minimize their potential energy and thereby increase their robustness. Internal forces are responsible for bringing the network to an equilibrium condition where the total energy is minimized. Embodiments of the present invention includes modeling of network control strategies as internal forces minimizing the energy of the network system for mobility control to dynamically adjust the location of backbone nodes based on computation of internal forces at the backbone nodes' locations as negative energy gradients and have showed how the network can autonomously achieve energy minimizing configurations driven by local forces exerted on network nodes.

The topology control problem in directional wireless backbone-based networks can be formulated as an energy minimization problem. The potential energy function for the network system is defined as the total communications energy stored in the wireless links forming the network topology, as follows:

$$U = \underbrace{\sum_{i=1}^{N} \sum_{j=1}^{N} b_{ij} u(R_i, R_j)}_{F} + \underbrace{\sum_{k=1}^{M} u(R_{h(k)}, r_k)}_{G},$$

$R_i$ is the location of the backbone node i, $r_k$ the location of terminal node k, N the number of backbone nodes, M the number of terminal nodes, h(k) the index of the backbone node covering terminal node k, and $b_{ij}$ the integer variables that determine the backbone topology, where T refers to the backbone topology:

$$b_{ij} = \begin{cases} 1, & \text{if } (i,j) \in T, \\ 0, & o.w., \end{cases}$$

The link cost function $u(R_i, R_j)$ represents the potential energy of link (i,j) and is defined as the communications energy per unit time needed to send information from node i to node j at the specified Quality of Service (QoS) (e.g., bit error rate (BER)).

Note that the first term in of the cost function, denoted by F, represents the total energy stored in the directional wireless links forming the backbone network, and the second term G represents the total energy stored in the wireless links covering the end users. Thus, F is a measure of cost for the backbone connectivity; that is, a higher value of F can indicate a backbone topology where higher communications energy needs to be provided in order to maintain backbone nodes connected. On the other hand, a higher value of G can indicate a higher demand for communications energy in order to maintain end users covered at the specified QoS (e.g., BER).

Thus, the joint coverage-connectivity optimization problem is formulated as a weighted multi-objective optimization problem of the following formula:

$$\min \left\{ U(b_{ij}, R_1, \ldots, R_N) = \right.$$

$$\left. \eta \cdot F + G = \eta \cdot \left( \sum_{i=1}^{N} \sum_{j=1}^{N} b_{ij} u(R_i, R_j) \right) + \left( \sum_{k=1}^{M} u(R_{h(k)}, r_k) \right) \right\},$$

$$\text{s.t. } b_{ij} = \begin{cases} 1, & \text{if } (i,j) \in T, \\ 0, & o.w. \end{cases}$$

Note that in the above formulation the optimization is performed over (1) the assignment of directional wireless links between backbone nodes $b_{ij}$ and (2) the location of the N backbone nodes $(R_1, \ldots, R_N)$. These are the controllable parameters from the topology control perspective. Topology Reconfiguration (TR) mechanisms can determine the link assignments $b_{ij}$ and Mobility Control (MC) mechanisms determine the locations $(R_1, \ldots, R_N)$.

The cost function U represents the potential energy of the communications network, that is, the communications energy needed to guarantee the communications functionality of the network system given its physical configuration in space. It can also be thought of as the communications energy stored in the network system; that is, the potential energy of an analogous physical system where communications links define forces of interaction between network nodes.

Regarding the optimization equation set forth above, note that the definition of the link cost function $u_{ij}$ will determine the form of the overall cost function U. As will be discussed in more detail later, link cost models are provided that take into account the spatial distribution of electromagnetic energy for the different wireless technologies used in directional wireless backbone-based networks.

Topology reconfiguration algorithms as set forth herein are for finding optimal link assignments between backbone nodes in order to minimize the overall network cost function. The topology reconfiguration problem can be presented as the following formula:

$$\min U(b_{ij}) = \sum_{i=1}^{N} \sum_{j=1}^{N} b_{ij} u(R_i, R_j),$$

$$\text{s.t. } b_{ij} = \begin{cases} 1, & \text{if } (i,j) \in T, \\ 0, & o.w. \end{cases}$$

Note that in the case of topology reconfiguration, the location of the backbone nodes $(R_1, \ldots, R_N)$ is fixed and the optimization is performed over the link assignment variables $b_{ij}$. Thus, the problem becomes that of finding sub-graphs with minimum total cost while satisfying connectivity constraints. Typically, at least bi-connectivity is imposed on the network topology, which can assure the existence of at least two disjoint paths between any pairs of nodes in the network.

Mobility management in directional wireless backbone-based networks can allow adjustment of backbone topology without breaking point-to-point links and thus avoiding temporary loss of data.

The mobility control problem can be formulated using the following equation, where now the link assignment variables $b_{ij}$ are fixed and the optimization is performed over the location of the backbone nodes $(R_1, \ldots, R_N)$.

$$\min U(R_1, \ldots, R_N) =$$

$$\eta \cdot F + G = \eta \cdot \left( \sum_{i=1}^{N} \sum_{j=1}^{N} b_{ij} u(R_i, R_j) \right) + \left( \sum_{k=1}^{M} u(R_{h(k)}, r_k) \right),$$

$$\text{s.t. } b_{ij} = \begin{cases} 1, & \text{if } (i,j) \in T, \\ 0, & o.w., \end{cases}$$

An iterative approach may be used to solve the above-indicated optimization equation. For each iteration the net force acting on each backbone node is computed to determine the backbone node's relocation direction. The net force acting on backbone node i may be defined as the negative energy gradient with respect to its location $R_i$ as set forth below, where $1(\cdot)$ is the indicator function (it takes value one if the statement within its argument is true, and it is zero otherwise) and $\nabla^i u_{ij}$ is the link energy gradient.

$$F_i = -\nabla^i U = \eta \sum_{j=1}^{N} b_{ij}(-\nabla^i u_{ij}) + \sum_{k=1}^{M} 1(h_{(k)} = i)(-\nabla^i u_{ik}),$$

The notion of the force acting at location $R_i$ due to the interaction of node i with its neighbor node j, is defined as the negative gradient of the potential energy stored at link (i,j), $u_{ij}$, with respect to the location $R_i$, as:

$$f_{ij} = -\nabla^i u_{ij} = \begin{bmatrix} -\dfrac{\partial u_{ij}}{\partial X_i} \\ -\dfrac{\partial u_{ij}}{\partial Y_i} \\ -\dfrac{\partial u_{ij}}{\partial Z_i} \end{bmatrix}.$$

Using the immediately preceding equation, the net force acting at location $R_i$ can be computed as the aggregation of the forces resulting from the interaction of node i with all its neighbor nodes as the following equation:

$$F_i = \eta \sum_{j=1}^{N} b_{ij} f_{ij} + \sum_{k=1}^{M} 1(h_{(k)} = i) f_{ik}.$$

The net force acting on a given backbone node i can be computed using local information only, that is, information about node i itself and its neighbors. Thus, distributed solutions to the mobility control problem can be developed in which each backbone node reacts locally based on forces exerted by neighbor nodes. Centralized global information is not needed, but may be taken into consideration if desired. Each backbone node can make movement decisions by itself informed by purely local information. The distributed nature of force-driven or force-based mobility control approach implemented in the present invention can be used to provide a scalable and self-organized control system for network performance optimization in dynamic scenarios. The self-organization aspect of force-based control systems and control algorithms can cause each backbone node to react locally, driven by forces from neighbor nodes; can provide for distributed reactions with no need for global information; and can provide global functionality through local interactions.

Figure 3:
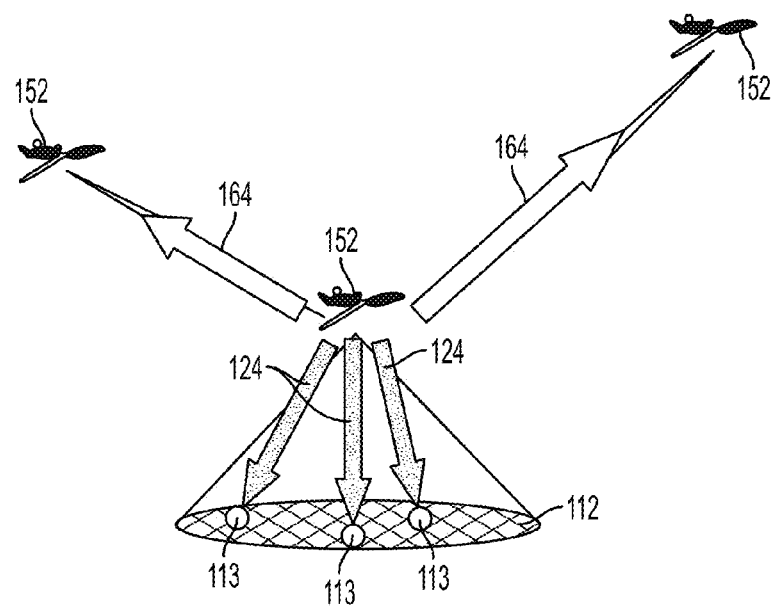
FIG. 3 is an illustration representative of two sets of attraction forces acting on a backplane node.

Referring to FIG. 3, which is an illustration representative of two sets of forces that can act on each backplane node. As shown in FIG. 3, the "middle" backplane node 152 has forces 164 from other backplane nodes 152 for backbone connectivity optimization, and forces 124 from terminal nodes 113 for network coverage optimization. Thus, communication links can define forces between network nodes, and the net force acting on the middle backbone node 152 can be computed as the sum of two sets of attraction forces: one coming from its neighbor backbone nodes 164 for backbone connectivity optimization, and the other one coming from the terminal nodes 124 assigned to backbone node 152 for coverage optimization.

FIGS. 7A-7D show morphing, using a force-driven control approach, of a directional wireless backbone so as to optimize end-to-end connectivity in a dynamic heterogeneous network. More specifically, FIGS. 7A-7D show an example, whereby a network with a ten-node free space optical (FSO) backbone network (larger dots) morphs by relocating backbone nodes in the direction of the net force (solid lines), driving the network topology to a minimum energy configuration that optimizes end-to-end connectivity.

The magnitudes of the forces can depend on the variation of the link energy function with respect to the location of the backbone nodes. In one or more embodiments of the present invention, convex energy functions may be used to characterize the potential energy of some communication links, taking into account the different communication technologies used in hierarchical wireless networks. These convex energy functions can translate into convex forces that increase with increasing signal attenuation and compete for improved connectivity.

In view of the heterogeneous nature of wireless networks according to embodiments of the present invention, a comprehensive link cost function for a wireless link (i, j) can be defined that takes into account the behavior of the diverse wireless technologies used in such heterogeneous wireless networks, including FSO, directional RF, and/or omnidirectional RF.

In one example of a harmonic model, the cost of a wireless link or its potential energy is a convex function of the link distance, as set forth in the following equation, where $P_{R0}$ is the minimum received power, $D_T$ is the directivity of the transmitter antenna, and $A_{eff\!R}$ is the effective receiver area:

$$u_{ij} = k_{ij}(e^{\alpha \|R_i - R_j\|})(\|R_j - R_i\|^2),$$

$$k_{ij} = P_{R0}^j \frac{4\pi}{D_T^i A_R^j},$$

The scattering coefficient α measures the attenuation electromagnetic radiation undergoes as it travels through the atmosphere due to the scattering effects caused by the presence of atmospheric agents in the form of suspended water particles such as fog, clouds, rain, or snow. Note that $k_{ij}$ and $\alpha_{ij}$ can vary from RF to FSO links. The high energy confinement of directional links (e.g., FSO links), used at the backbone layer, can allow for long-distance links, while omnidirectional RF links, which may be used to communicate between backbone and terminal nodes, can produce stronger forces to maintain short link distances and low energy cost.

In practical situations, optimal configuration of backbone nodes may involve, for example, transmitted power requirements exceeding physical constraints. Thus, the increase in transmitted power needed to maintain a given link Quality of Service (QaS) (e.g., BER), for instance, may be limited by the maximum power at a transmitter of one of the nodes. Generally speaking, backbone node connections according to embodiments of the present invention can be compromised, and this can require a reduction in the force on certain links in order to minimize the loss of end-to-end connections (i.e., retain the connections).

Non-convex energy functions, such as Morse potential as an energy function, can be used to provide for the relaxation or release of forces between nodes when or before reaching power limitation constraints, for example. In one or more embodiments, optionally, only power constraints and no other constraints may be used to model network potential energy.

The following equation represents an example of a non-convex potential energy model for the terminal nodes of a wireless network, in this case "Morse Potential," according to embodiments of the present invention. The following Morse potential energy equation takes into consideration power limitation constraints, as it expressly includes the effects of bond breaking (i.e., release of the connection). In the context of wireless communication networks, the following equation can be used for the potential energy of wireless link (i, j):

$$u_{ij} = D_{ij}(1 - e^{-\beta_{ij}\|R_j - R_i\|})^2.$$

Figure 4:
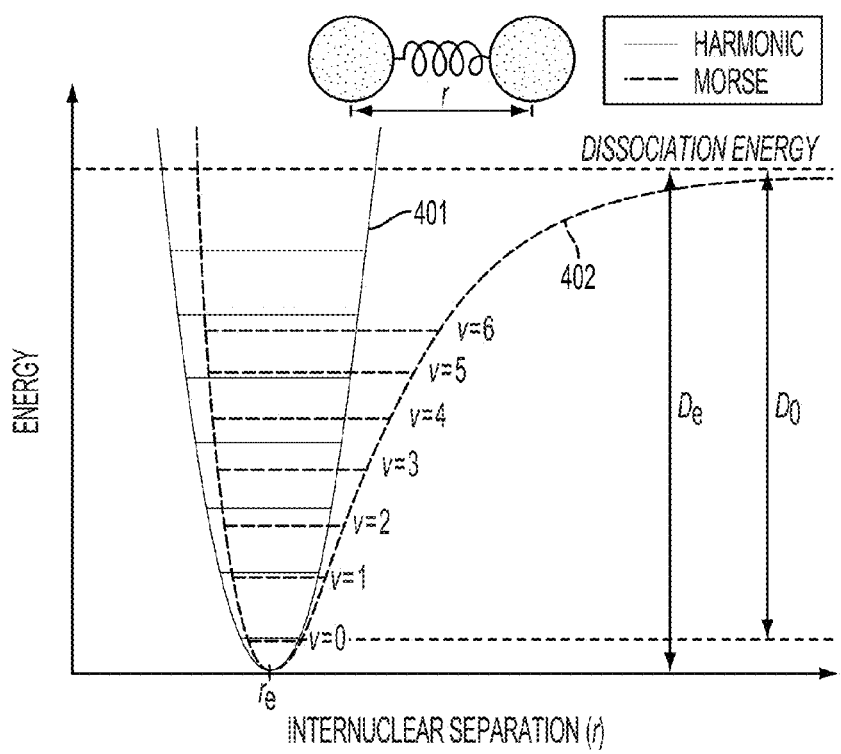
FIG. 4 is a graph showing a comparison between a convex force-driven model and a non-convex force-driven model for modeling and backbone mobility control according to one or more embodiments of the invention.

FIG. 4 is graph showing a comparison between a convex force-driven model and a non-convex force-driven model for modeling and backbone mobility control according to one or more embodiments of the invention. Note that the harmonic/exponential model is represented by a convex energy function, where force increases with distance and connections to retain the node-node link. On the other hand, the non-convex model indicates that energy saturates with distance (i.e., it emulates power limitations) and force increases to a threshold, then starts decreasing to release or relax the node-node link.

As indicated previously, systems and methods according to embodiments of the present invention can implement control strategies to dynamically morph the network topology based on local forces exerted on network nodes, and the force can be computed as the gradient of the potential energy. Thus, note that using the harmonic potential model, the force increases quadratically (or exponentially in the presence of atmospheric obscuration) as the link distance increases. The idea is that the longer the distance, the stronger the force in order to maintain the connection. This control process may be referred to as the "retention" of a connection. Retention of a connection can be applicable only to high priority or essential nodes, for instance, only to backbone nodes. Alternatively, retention of a connection can also apply to non-essential or low priority nodes, such as terminal nodes.

Figures 5A, 5B:
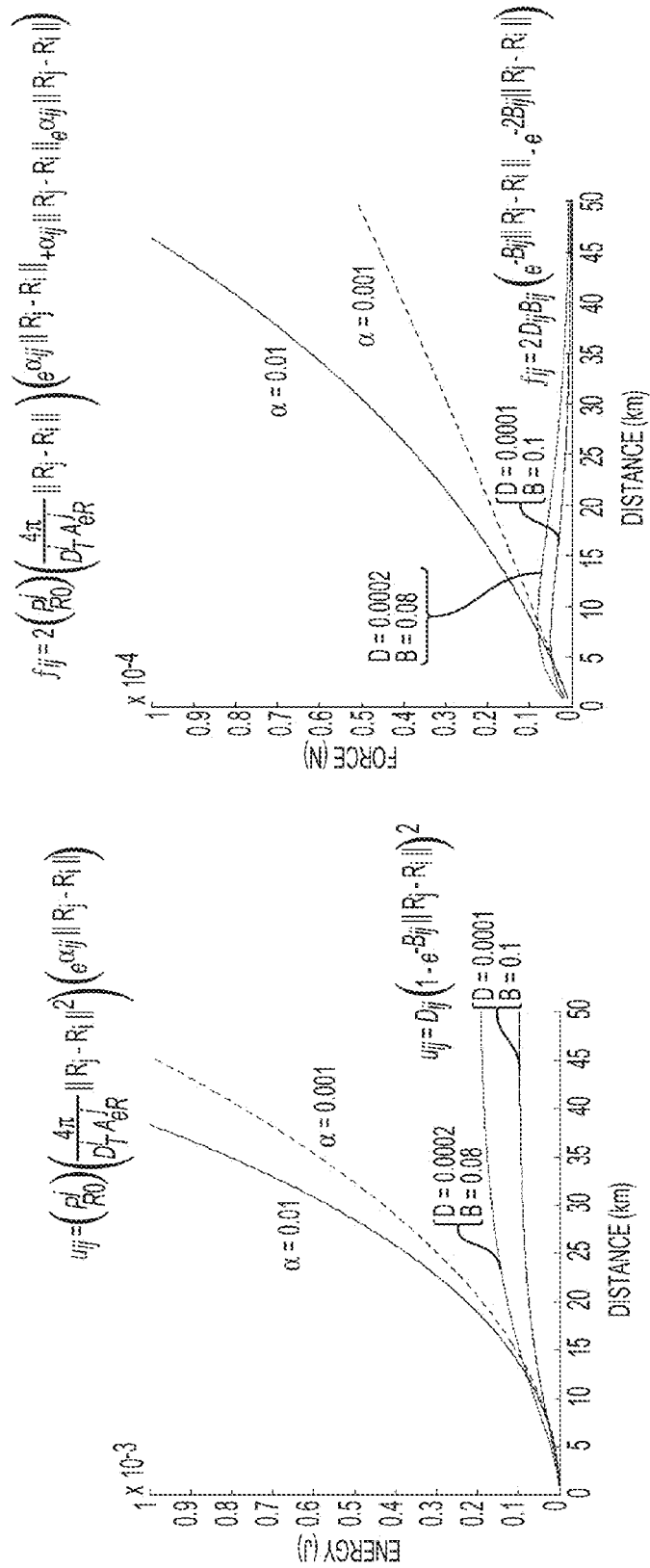
FIGS. 5A and 5B are graphs of potential energy and force, respectively, for harmonic and non-harmonic models.

On the other hand, under the non-convex model (e.g., Morse potential model), the force can increase up to a point and then can start decreasing and converge to zero as the link distance increases. This control process may be referred to as the "release" or relaxation of a connection. FIGS. 5A and 5B illustrates the potential energy (FIG. 5A) and the force (FIG. 5B) for both the harmonic and Morse potentials. Note that for small link distances, both models behave analogously, and after a given link distance (in this case around 10 km), the harmonic potential models the increase in both energy and force to retain the connection, whereas for the Morse potential, models the saturation of the energy, and the decrease of the force to relax or release the given connection.

Figure 6:
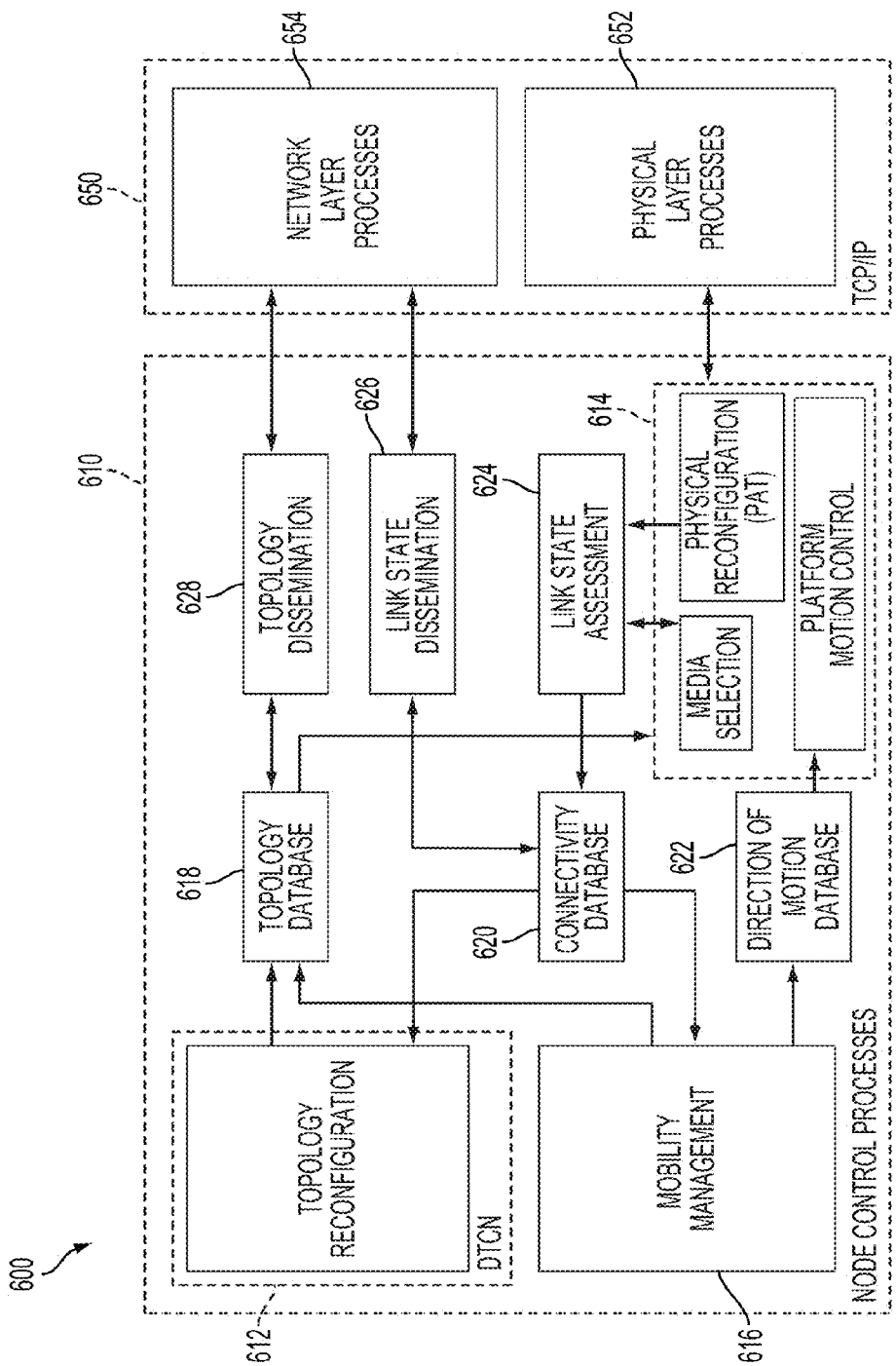
FIG. 6 is a block diagram of an example of a system according to one or more embodiments of the invention.
Figure 8A:
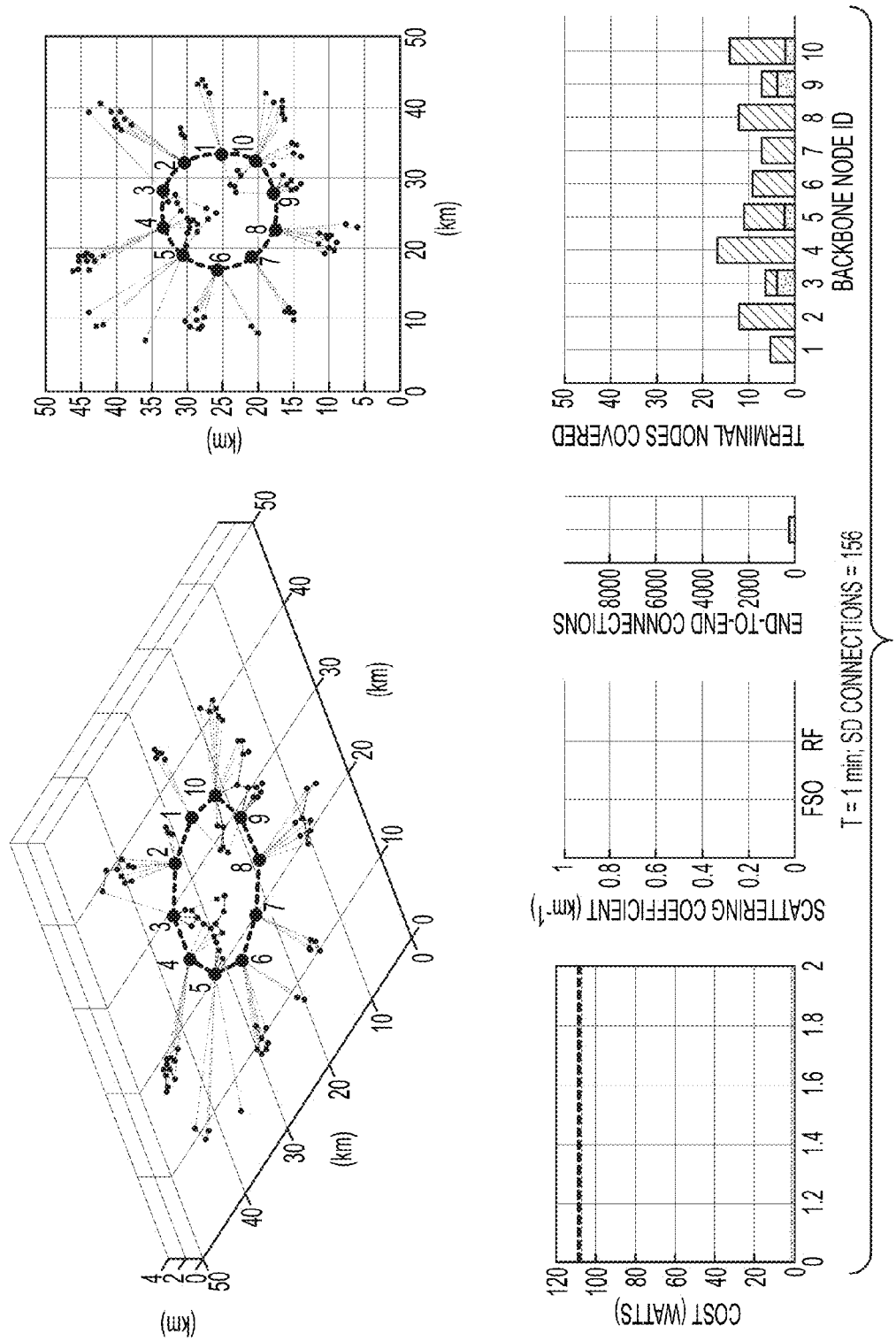
FIGS. 8A-8E are graphs showing network evolution and corresponding network characteristics according to one or more embodiments of the invention.
Figure 8B:
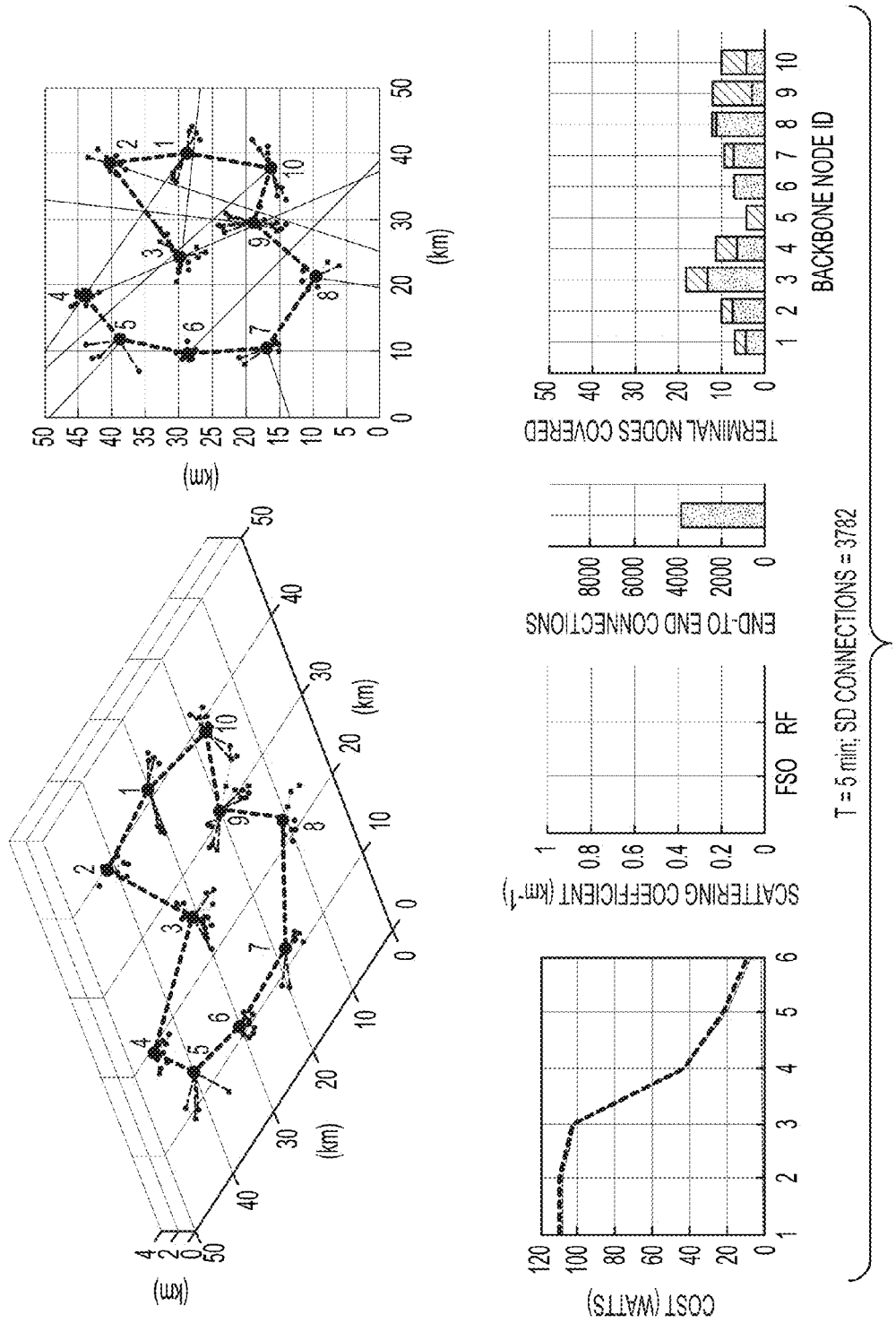
Figure 8C:
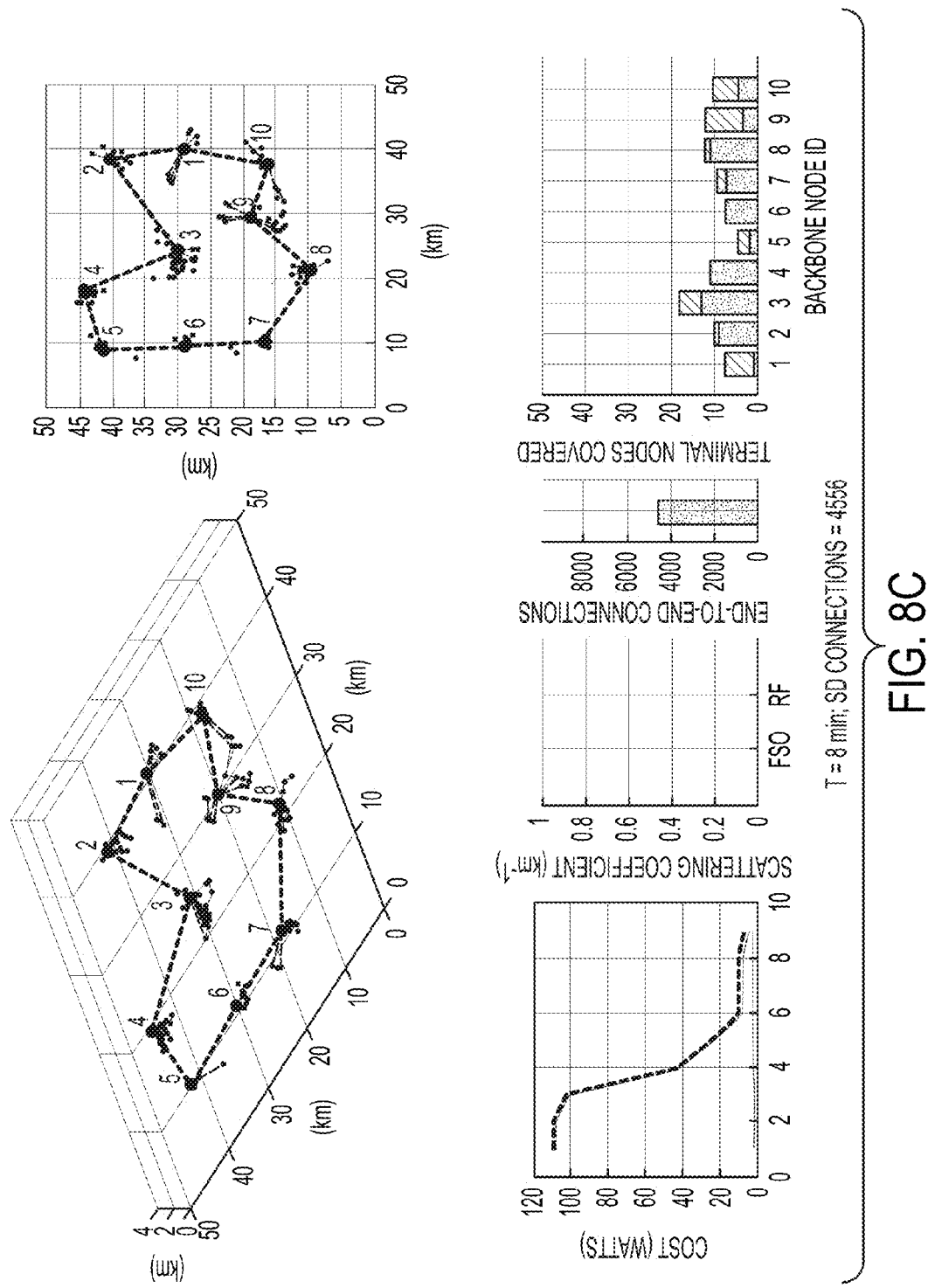
Figure 8D:
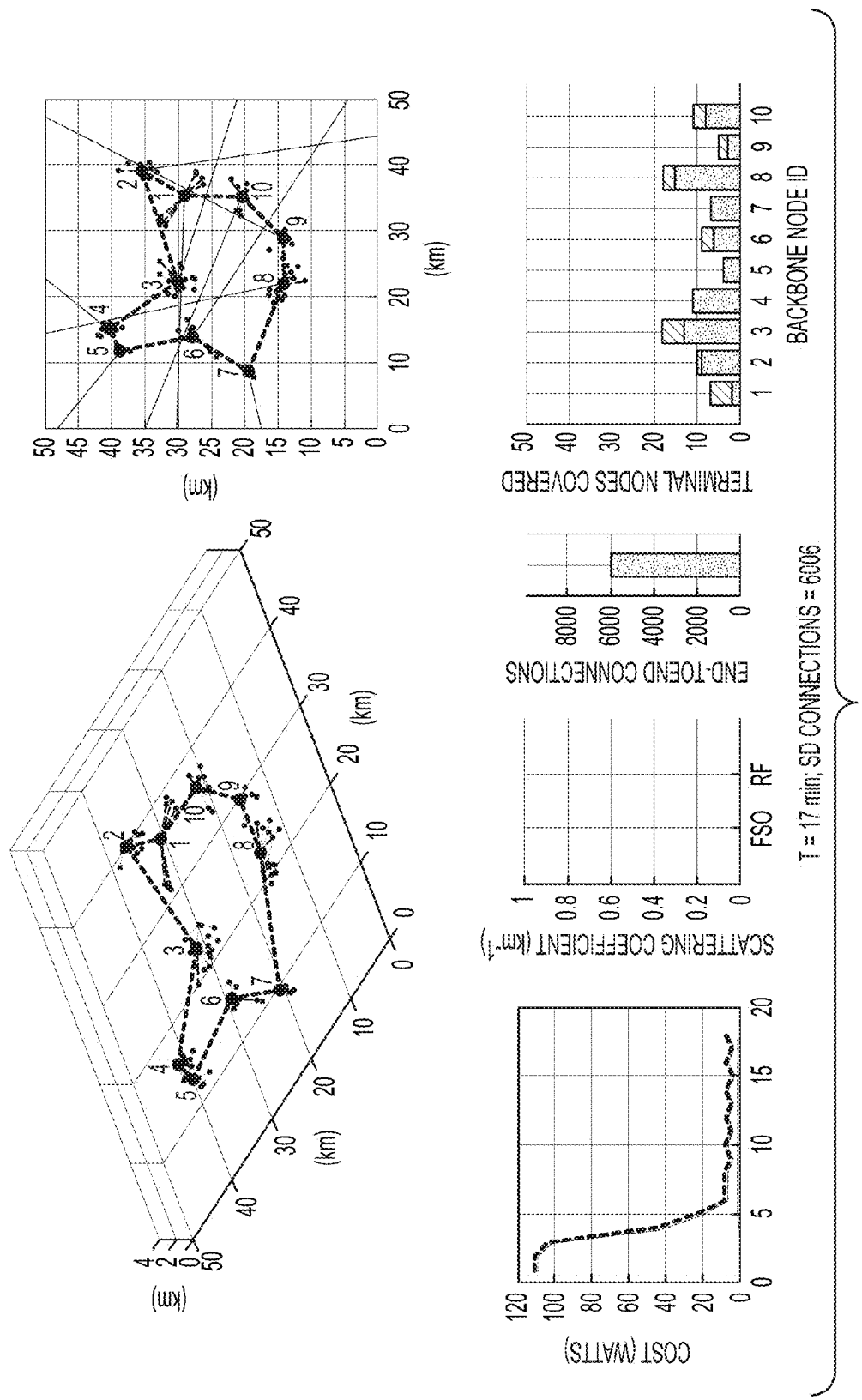
Figure 8E:
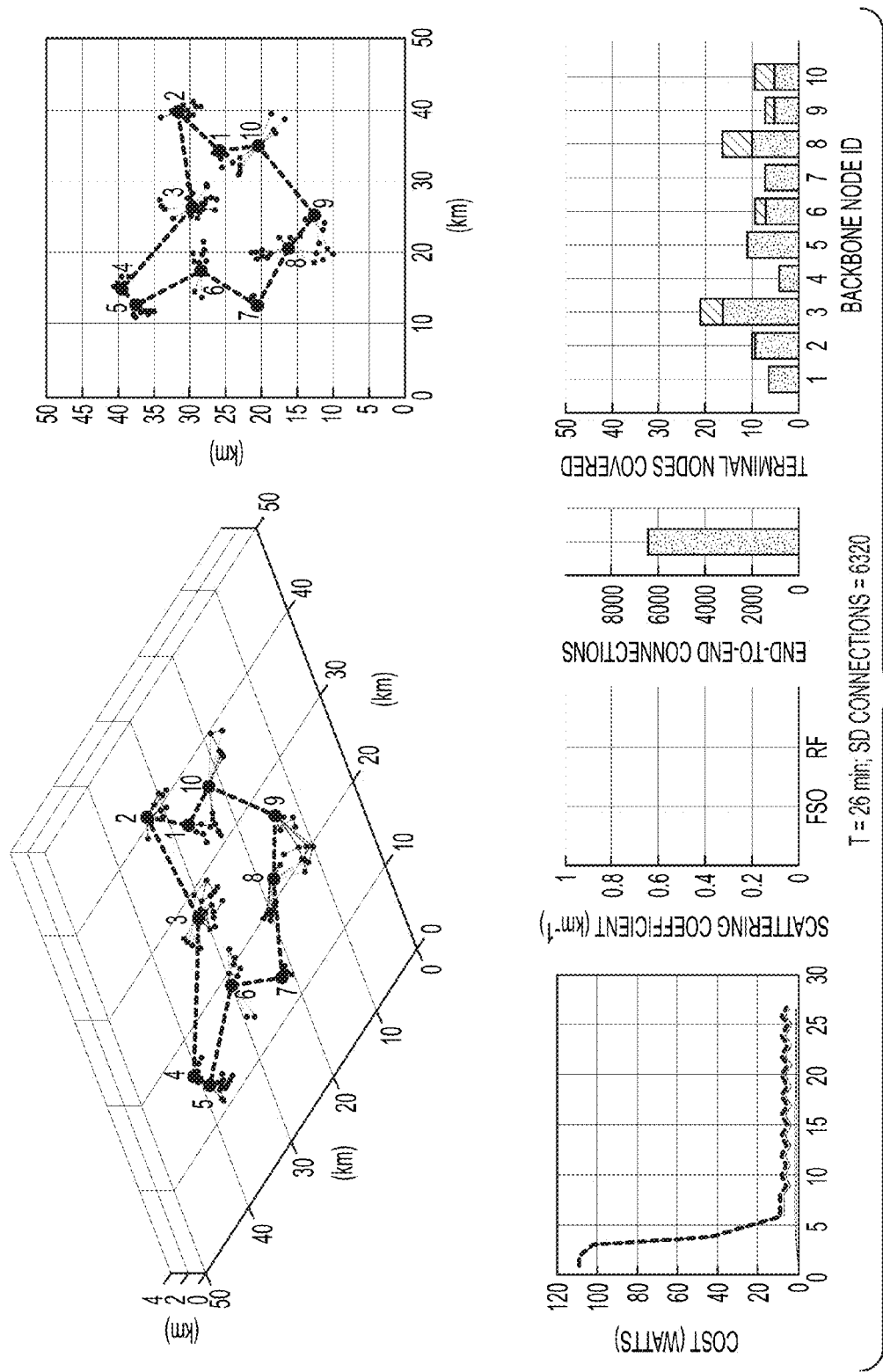

FIG. 6 is a block diagram of an example of a system 600 according to one or more embodiments of the invention. Generally speaking, system 600 can provide and implement a force-driven topology- and mobility-control mechanism for dynamic heterogeneous networks with physical constraints (e.g., transmission power, capacity), which can include different type of forces for releasing or retaining connections depending on their effect on the communications functionality.

System 600 can include a node control process component 610 that implements backbone node control processes. The control process component 610 can be integrated with protocol component 650, which can be an Internet-based component that includes a network layer component 654 to provide network layer processes and a physical layer component 652 to provide physical layer processes. Protocol component 650 may be compatible with any packet switched protocol.

Node control process component 610 can include a designated topology control node (DTCN) component, for instance, having a topology reconfiguration component that is operative to perform backbone network topology reconfiguration. Such topology reconfiguration can be as set forth herein. Further, in one or more embodiments, such topology reconfiguration component can be based on U.S. Pat. No. 6,990,350 (previously incorporated by reference).

Node control process component 610 also can include a mobility management component 616 that implements backbone node mobility control and management as set forth herein. Such mobility management component 616 can be operative with a topology database 618, a connectivity database 620, a direction of motion database 622, a topology dissemination component 628, a link state dissemination component 626, a link state assessment component 624, and a media selection, physical reconfiguration (Pointing Acquisition Tracking (PAT)) and platform motion control component 614, for instance. As alluded to earlier, system 600 or variations thereof (e.g., non-IP-based), can be implemented onboard air-, land-, sea-, and/or space-based vehicles to form backbone nodes of a directional wireless backbone network.

Further, functionality (i.e., software/algorithms) may be distributed across the vehicle-backbone nodes. The algorithms can show constant time complexity. Further, the algorithms can produce global optimal solutions based on local interactions.

Returning to the discussion involving power constraints, note that due to power constraints, wireless links will not always be available. Exceeding link distances and atmospheric obscuration can cause link breaks that may terminate source-to-destination (SD) connections in the network. To take into account this effect, the following metric of interest is introduced: SD connections. SD connections can indicate the number of SD pairs connected in the network; that is, the number of SD pairs for which a path exists between them. This metric may be used as a measure of network performance under power limitation constraints.

To the following equation, power limitation constraints are included as an additional exponential force that avoids nodes moving further apart from the maximum distance allowed by the maximum transmitted power available at the network nodes. The exponential constraint force at the location of node i due to its interaction with node j can be defined according to the following formula, where m is the constraint force exponent and $d^{max}_{ij}$ is the maximum distance allowed between node i and j in order to maintain the specified link BER when node i transmits with maximum transmit power $P^{max}_{Ti}$, and ç is a positive distance value:

$$f_{ij}^c = e^{m(\|R_i - R_j\| - (d_{ij}^{max} - \delta))},$$

Note that $$f_{ij}^c \begin{cases} \leq 1 & L \leq d_{ij}^{max} - \delta, \\ \geq 1 & L \geq d_{ij}^{max} - \delta. \end{cases}$$

Thus, the values for m and ç are chosen to make $f^c_{ij}$ negligible for values of $L \geq d^{max}_{ij}$.

In order to define the total force acting on node i due to its interaction with node j under power limitation constraints, unconstrained force $f_{ij}$ can now be defined as $f^u_{ij}$. The total force acting on backbone node i due to its interaction with node j can then be defined as the following equation:

$$f_{ij} = f_{ij}^u + f_{ij}^c,$$

$$f_{ij} = \left(P_{R0}^j \frac{4\pi}{D_T^j A_{eR}^j}\right) \times \left(\frac{n\|R_i - R_j\|^{n-2} e^{\alpha_{ij}\|R_i - R_j\|} +}{\alpha_{ij}\|R_i - R_j\|^{n-1} e^{\alpha_{ij}\|R_i - R_j\|}}\right) R_{ij} + e^{m(\|R_i - R_j\| - (d_{ij}^{max} - \delta))}.$$

Thus, when power limitations are imposed on network nodes, the force-driven mobility control algorithm can be updated with $f_{ij}$ using the above-indicated total force equation.

The constraint force can involve a sharp increase in the magnitude of the force when the link distance reaches its maximum. In a heterogeneous network such as DWB-based networks with terminal nodes connected through a directional backbone, embodiments of the present invention can use the constraint force on only for backbone links, as backbone links can be essential for maximizing end-to-end communications.

As indicated above, the Morse potential can be one way by which to model the saturation of link cost/energy when reaching physical constraints. Thus, the Morse potential model can be used to allow backbone nodes to relax or release the force on certain connections that may be causing excessive stress on the network and are not essential or of sufficient priority. For example, in the case of DWB-networks, backbone links are of most importance for communications. The loss of a single backbone-backbone link may cause multiple end-to-end disruptions, while the loss of a single backbone-terminal link may cause at most one end-to-end disruption.

Accordingly, one or more embodiments of the present invention can implement a network control methodology based on the following dynamic reaction under a possible network degradation/partition event: (1) release connection, whereby nonessential or low priority links can be modeled using a non-convex model, such as the Morse potential, and if the cost or force to maintain the connection exceeds a predetermined threshold, the link is relaxed or released; (2) retain connection, whereby essential or higher priority links can be modeled using a harmonic potential so that the network can always attempt to retain such connections; and (3) reconfigure topology, whereby if there is a better (i.e., more optimal) topology or an essential or high priority link has been lost, the network topology can be reconfigured in a reconfiguration phase to regain or improve connectivity. Generally, the essentiality or priority of communication links can depend on the application or network objectives. For example, essential or high priority links can involve links with critical high-priority traffic or those carrying a high number of end-to-end flows. Also, within the present control framework, a given link may be treated as essential or nonessential at different points in time. Optionally, the traffic being carried and the importance of the link within the global network can be used to determine its essentiality label.

Figure 9:
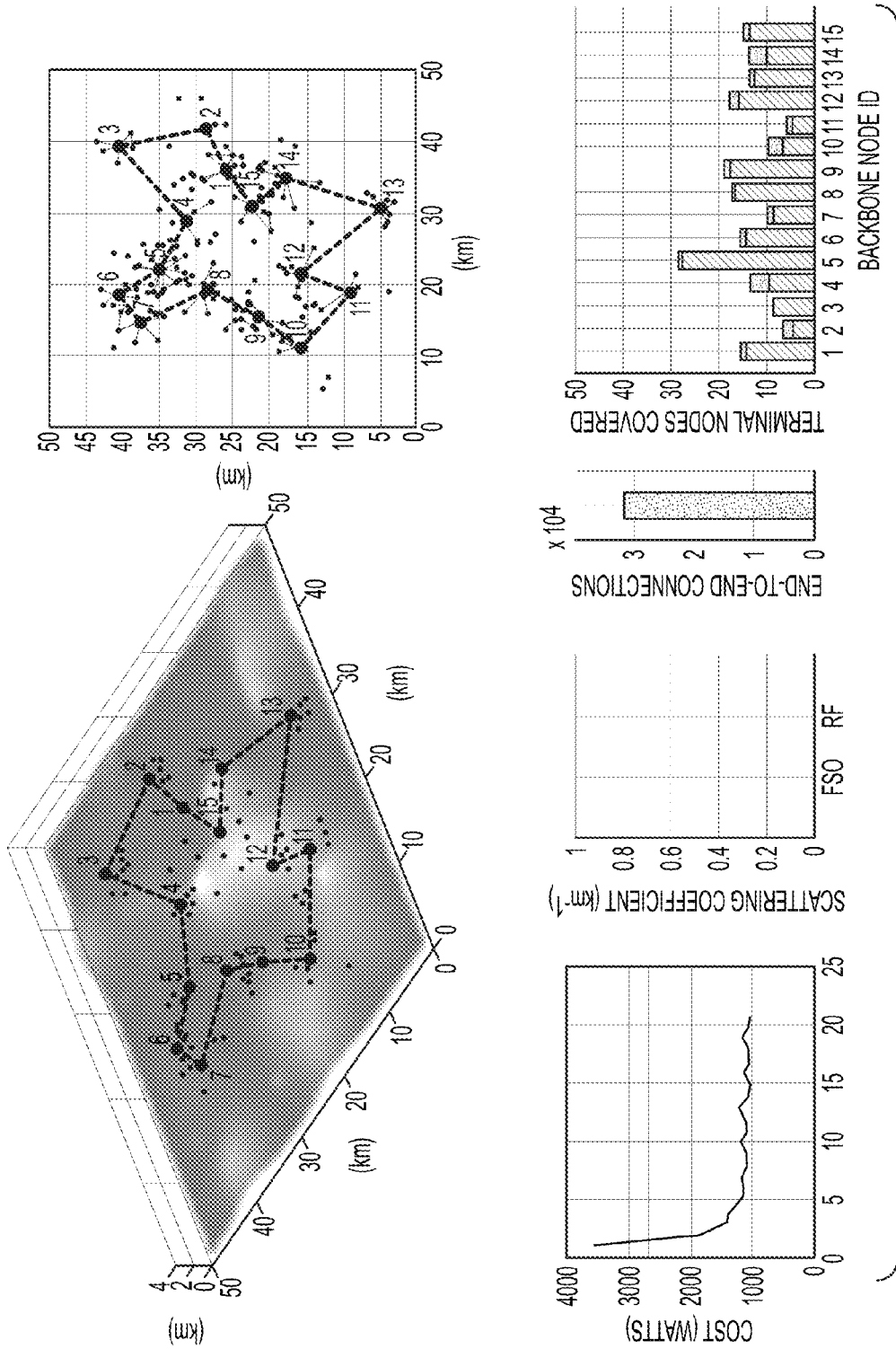
FIG. 9 shows network and node reactions to a force-driven adaptive control method according to one or more embodiments of the invention.

FIGS. 8A-8E are graphs showing an example of network evolution and corresponding network characteristics according to one or more embodiments of the invention. FIG. 9 shows network and node reactions to a force-driven adaptive control method according to one or more embodiments of the invention.

As indicated above, embodiments of the present invention can not only optimize network configuration, but can also predict a likelihood of one or more link degradation and/or failure. Accordingly, embodiments of the present invention can predict future network performance (e.g., link degradation and/or failure) as a means by which to monitor network performance health. Further, global network health can be monitored by tracking certain network dynamics, which will be described below.

Figure 10A:
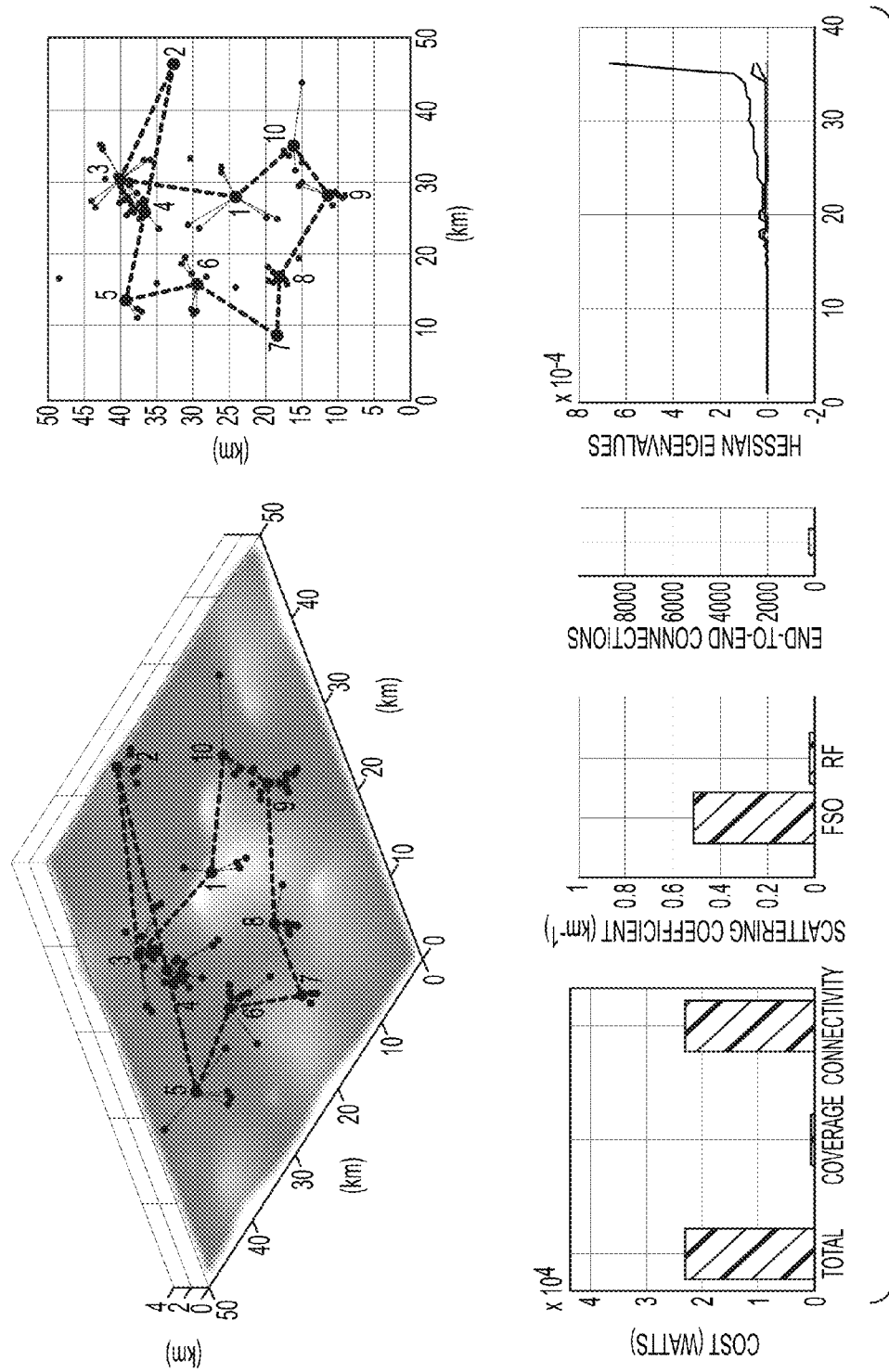
FIGS. 10A and 10B illustrate network reconfiguration and correlation between the evolution of network dynamics and Eigenvalues according to one or more embodiments of the invention.
Figure 10B:
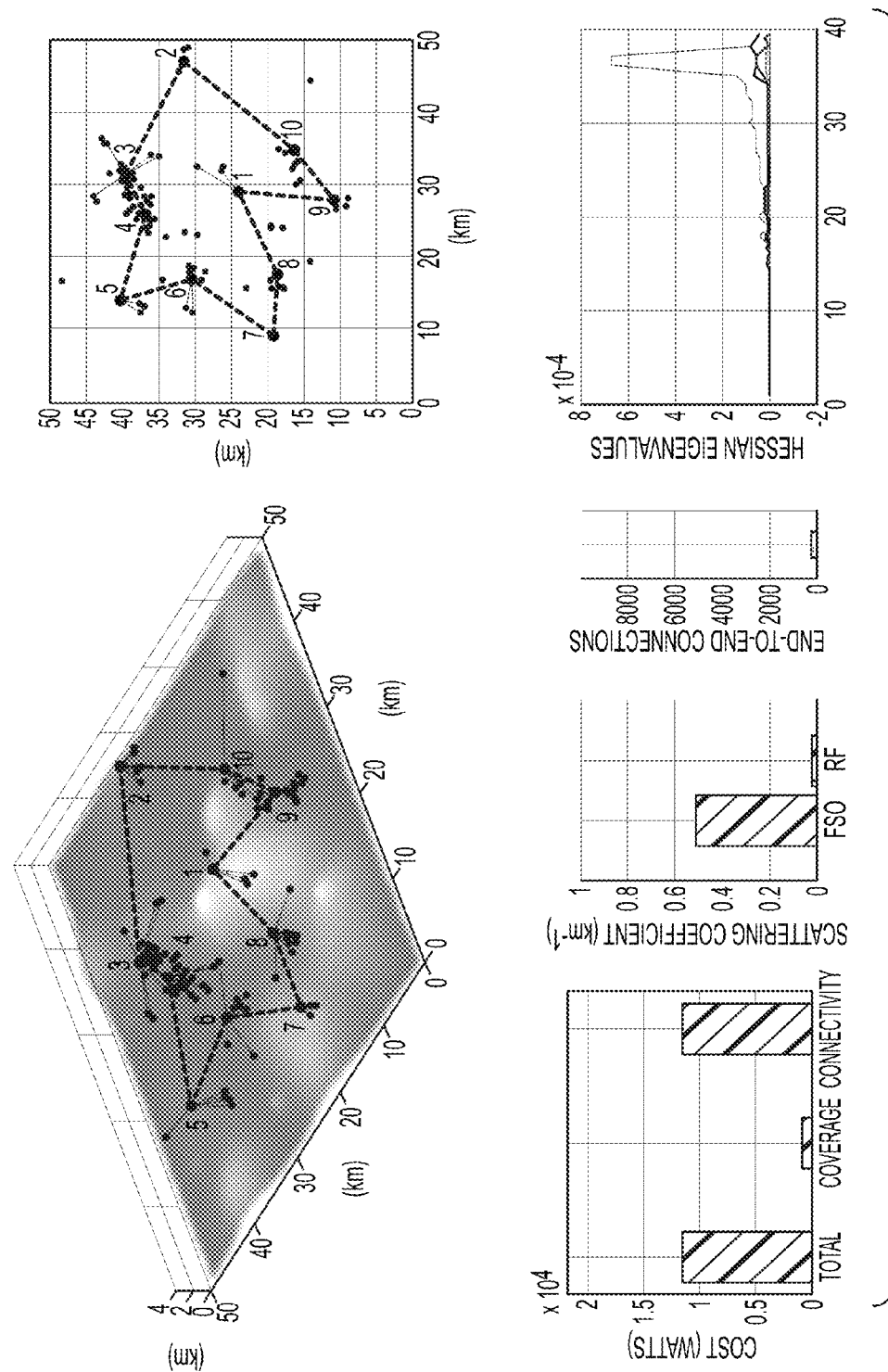

Generally speaking, the network links can be represented by a Hessian matrix. The Eigenvalues of the Hessian matrix can be monitored as the network system evolves in response to its dynamic environment. FIGS. 10A and 10B illustrate network reconfiguration and correlation between the evolution of network dynamics and Eigenvalues according to one or more embodiments of the invention. FIG. 10A shows the network before reconfiguration, where Eigenvalue peak correlates with non-optimal configuration. FIG. 10B shows the network after reconfiguration, where Eigenvalues go down as the network goes back to a minimum energy configuration. Thus, Eigenvalues approach larger values when network failure or degradation is imminent. FIGS. 10A and 10B indicate that the system undergoes a topology reconfiguration when reaching an anomalous non-optimal configuration. An anomalous non-optimal configuration also may cause repositioning of backbone nodes.

Normal mode analysis, as one example, can be used for network performance prediction and network health monitoring, thereby providing the ability to trigger network reactions prior to degradation or failure. Regarding normal mode of a network, in normal mode motion, all nodes would vibrate about their equilibrium positions at the same frequency. Analysis of a normal mode frequency can be performed and if it is tending toward zero this can indicate likely future link degradation or failure. Further, a normal mode frequency showing anomalous behavior, such as a discontinuous jump in value, can indicate possible future occurrence of a link degradation or failure state. To put it another way, to predict network degradation or failure conditions, changes in normal mode frequencies regarding a morphing network can be tracked. The normal mode "softening" can be compared with network metrics for configuration or reconfiguration. The normal mode frequencies can be examined to determine if anomalous changes exist, such as bifurcation, instability, or chaos.

In view of the foregoing structural and functional features described above, methods in accordance with one or more embodiments of the invention will now be described with respect to FIGS. 11-14. While, for purposes of simplicity of explanation, the methodologies of FIGS. 11-14 are shown and described as executing serially, it is to be understood and appreciated that the invention is not limited by the illustrated order, as some aspects or steps could, in accordance with the present invention, occur in different orders and/or concurrently with other aspects or steps. Moreover, not all illustrated features may be required to implement a method or methods in accordance with one or more embodiments of the invention.

Method 1100 can include forming a plurality of wireless communication links between end-user nodes and backbone nodes and between the backbone nodes, thereby forming a wireless communication network 1102. Global assessment of connectivity and coverage costs can be performed 1104, and the backbone nodes can be caused or controlled to reposition or move, if necessary, automatically in relation to corresponding end or terminal nodes 1106. The method 1100 can predict network link failures or degradation by tracking normal mode frequencies obtained from a matrix analysis as the backbone and end-user nodes move, for instance 1106. The method 1100 can also predict network link failures or degradation by tracking movement of the network platforms within a global potential energy space 1108. Responsive to the predicting, the network can reconfigure, if necessary, before occurrence of any predicted network link failures or degradation so as to avoid or mitigate the effects of any predicted network link failures or degradation 1110. The automatically moving the backbone nodes and the predicting network link failures or degradation can be performed in parallel.

Method 1200 can be an adaptive control method for a wireless backbone network. The method 1200 can comprise receiving link cost or force data, for instance for connectivity and coverage, and determining respective costs or forces associated with a plurality of communication links between nodes 1202. The link cost may be modeled using a non-convex model of link potential energy, such as Morse potential. The method 1200 can further comprise determining whether to release or retain any of the links based on the determined cost or force 1204. The network can also determine whether to reconfigure (and reconfigure if necessary) in response to the release/retain determination 1206.

Method 1300 also is an adaptive control method and can comprise receiving link cost or force data, for instance, for connectivity and/or coverage, and determining respective costs or forces associated with a plurality of communication links between nodes 1302. Based on the cost/force data, the method 1300 can release one or more node connections, retain one or more node connections, and/or reconfigure one or more node connections.

Method 1400 is directed to a method for predicting network health of a heterogeneous network having terminal platforms and backbone platforms implemented in a directional wireless backbone network. Method 1400 can comprise tracking normal mode frequency-values/Eigenvalues or Eigenvalue anomalies 1402. Method 1400 can also determine or identify possible future occurrences of unwanted or undesirable network conditions, such as link interruptions or degradations 1404. Responsive to the determining or identifying, the method 1400 can determine future backbone node movement 1406 and reconfiguring the network, if necessary, to avoid any determined possible future unwanted or undesirable network conditions 1408.

It will be appreciated that portions (i.e., some, none, or all) of the circuits, circuitry, modules, processes, sections, systems, and system components described herein can be implemented in hardware, hardware programmed by software, software instructions stored on a non-transitory computer readable medium or a combination of the above.

For example, the processor can include, but is not be limited to a computing system that includes a processor, microprocessor, microcontroller device, or is comprised of control logic including integrated circuits such as, for example, an Application Specific Integrated Circuit (ASIC) or a field programmable gate array (FPGA). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Furthermore, the circuits, circuitry, modules, processes, systems, sections, and system components can be implemented as a single processor or as a distributed processor. Further, it should be appreciated that the steps mentioned above may be performed on a single or distributed processor (single and/or multi-core). Also, the processes, components, modules, and sub-modules described in the various figures of and for embodiments above may be distributed across multiple computers or systems or may be co-located in a single processor or system. Exemplary structural embodiment alternatives suitable for implementing the circuits, circuitry, modules, sections, systems, system components, means, or processes described herein are provided below.

The circuits, circuitry, modules, processors, systems, or system components described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the user interface and/or computer programming arts.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A mobility control and link-failure prediction method implemented in a dynamic, heterogeneous, directional wireless backbone (DWB)-based communication network having multiple tiers of nodes for providing access to the communication network including end-user nodes and movable backbone nodes, the method comprising:

forming a plurality of wireless communication links between the end-user nodes and the backbone nodes and between the backbone nodes, respective backbone to backbone wireless communication links being directional wireless transmissions and characterized as high priority network communication links, and respective backbone to end-user wireless communication links being characterized as low priority network communication links, at least one of the backbone to end-user wireless communication links being of a different transmission form than at least one of the backbone to backbone wireless links;

automatically moving the backbone nodes in relation to corresponding end-user nodes, said moving being based on a convex model for the high priority network communication links and a non-convex model for the low priority network communication links;

predicting network link failures or degradation by tracking normal mode frequencies obtained from a matrix analysis as the backbone and end-user nodes move, and/or by tracking movement of the nodes within a global potential energy space; and responsive to said predicting network link failures or degradation, reconfiguring the network before occurrence of any predicted network link failures or degradation so as to avoid or mitigate the effects of any predicted network link failures or degradation, wherein said automatically moving the backbone nodes and said predicting network link failures or degradation are performed in parallel.

2. The method according to claim 1, wherein a normal frequency mode tending toward zero indicates a potential link failure and/or a normal mode frequency showing anomalous behavior indicates a potential link failure.

3. The method according to claim 1, wherein the communication network is operative using any packet switched protocol.

4. The method according to claim 1, wherein the wireless communication links between backbone nodes are in the form of one or more of free space optical (FSO) transmissions and directional radio frequency (RF) transmissions.

5. The method according to claim 1, wherein the method is implemented by distributed algorithms.

6. The method according to claim 1, wherein said automatically moving the backbone nodes is such that the backbone nodes follow corresponding end-user nodes to provide an aggregate network quality of service level.

7. The method according to claim 1, wherein said automatically moving the backbone nodes is responsive to determinations regarding whether to release low priority network communication links and whether to retain high priority network communication links.

8. The method according to claim 1, wherein:
the communication network is a cellular or IP-based network, and
each of the movable backbone nodes is of a higher capability than each of the end-user nodes.

9. The method according to claim 1, further comprising:
beam steering of a radio frequency (RF) or a free space optical (FSO) transmission as one of the directional wireless transmissions,
wherein the beam steering is performed by mechanical movement of corresponding transmitting antennas or by phased array methodology in corresponding transmitting antennas.

10. The method according to claim 1, wherein:
the network link failures or degradation include network topology anomalies, and
said predicting network link failures or degradations is based on correlations between peaks in eigenvalues of a Hessian matrix of network potential and the network topology anomalies.

11. A dynamic, heterogeneous, directional wireless backbone (DWB)-based communication network comprising:
a first tier having a plurality of end-user nodes; and
a second tier forming a directional wireless backbone network and comprising a plurality of movable backbone nodes, the backbone nodes being configured to form a plurality of wireless communication links between each other and the end-user nodes, respective backbone to backbone wireless communication links being directional wireless transmissions and characterized as high priority network communication links, respective backbone to end-user wireless communication links being characterized as low priority network communication links, wherein at least one of the backbone to end-user wireless communication links are of a different transmission form than at least one of the backbone to backbone wireless links, each backbone node is configured to automatically move in relation to corresponding end-user nodes based on a convex model for the high priority network communication links and a non-convex model for the low priority network communication links, the directional wireless backbone network being configured to predict network link failures or degradation, in parallel with the automatically moving, by tracking normal mode frequencies obtained from a matrix analysis as the backbone and end-user nodes move and/or by tracking movement of the nodes within a global potential energy space, the directional wireless backbone network being further configured, to reconfigure responsively to the predicted network link failures or degradation before occurrence thereof so as to avoid or mitigate effects of any predicted network link failures or degradation.

12. The communication network according to claim 11, wherein the backbone to backbone wireless communication links are in the form of one or more of free space optical (FSO) transmissions and directional radio frequency (RF) transmissions.

13. The communication network according to claim 11, further comprising one or more processors with distributed algorithms that show constant time complexity and produce global optimal solutions based on local interactions.

14. The communication network according to claim 11, wherein the non-convex characterizations of potential energy of the low priority network communication links in the presence of physical constraints is the Morse potential.

15. The communication network according to claim 11, wherein the backbone nodes are configured to move and to follow corresponding end-user nodes to provide an aggregate network quality of service level.

16. A method for a dynamic, heterogeneous, directional wireless backbone (DWB)-based communication network having multiple tiers of nodes for providing access to the communication network including end-user nodes and movable backbone nodes, the method comprising:
forming a plurality of wireless communication links between the end-user nodes and the backbone nodes and between the backbone nodes, respective backbone to backbone wireless communication links being directional wireless transmissions and characterized as high priority network communication links, and respective backbone to end-user wireless communication links being characterized as low priority network communication links, at least one of the backbone to end-user wireless communication links being of a different form than at least one of the backbone to backbone wireless links; and
automatically moving the backbone nodes in relation to corresponding end-user nodes and responsive to predicted network link failures or degradation,
wherein the automatically moving is based on at least a non-convex model of link potential energy for the low priority network communication links.

17. The method of claim 16, further comprising predicting network link failures or degradation by tracking normal mode frequencies obtained from a matrix analysis as the backbone and end-user nodes move, and/or by tracking movement of the nodes within a global potential energy space, and the automatically moving is such that effects of any predicted network link failures or degradation are avoided or mitigated.

18. The method of claim 16, wherein the automatically moving is further based on a convex model of link potential energy for the high priority network communication links.

\* \* \* \* \*